Figure 1:
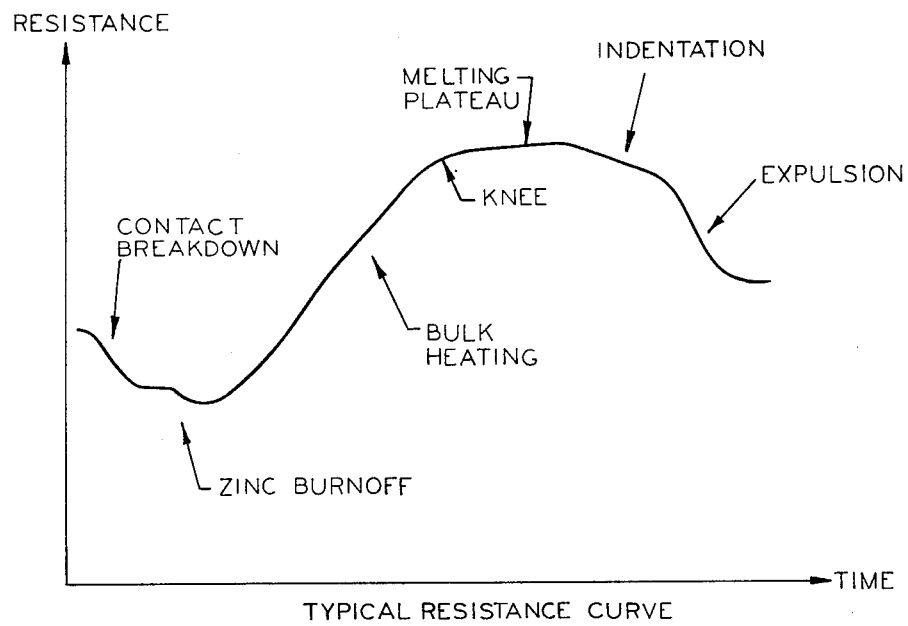

United States Patent [19]

Cleveland et al.

[11] Patent Number: 4,477,709
[45] Date of Patent: Oct. 16, 1984

[54] METHOD AND APPARATUS FOR DETECTING EDGE WELDS DURING RESISTANCE SPOT WELDING

[75] Inventors: Dixon Cleveland, Vienna, Va.; James R. Havens, Sterling Heights; Gregory L. Nagel, Royal Oak, both of Mich.; Basil A. Decina, Jr., McLean, Va.; William C. Jenuwine, Washington, Mich.

[73] Assignee: General Motors Corporation, Detroit, Mich.

[21] Appl. No.: 498,062

[22] Filed: May 25, 1983

[51] Int. Cl.$^3$ .............................................. B23K 11/24
[52] U.S. Cl. .................................. 219/109; 219/117.1
[58] Field of Search ...................... 219/109, 110, 117.1, 219/108

[56] References Cited

U.S. PATENT DOCUMENTS 3,591,764  7/1971  Taran et al. ........................ 219/110
3,662,146  5/1972  Vanderhelst ........................ 219/110

Primary Examiner—C. C. Shaw
Attorney, Agent, or Firm—Warren D. Hill

[57] ABSTRACT

During a weld period the weld parameters are monitored and data representing the weld resistance curve and the power curve are acquired and stored for analysis by a suitably programmed computer. The derivative of R, $\dot{R}$ is calculated and stored and the function is divided by power P to obtain $\dot{R}/P$. The resistance curve is searched to obtain the maximum value $R_m$ which occurs during the heating phase and the function $\dot{R}/P$ is searched prior to the time of $R_m$ to find the maximum of that curve representing the highest rate of resistance increase. Then the $\dot{R}/P$ curve is searched subsequent to its maximum to determine when the function reaches a specified percentage of the maximum. That value occurs at the knee of the resistance curve and approximates the onset of melting in the weld.

A prediction of whether a weld is a nugget or a sticker is made by calculating the ratio of weld energy after the onset of melting to the total weld energy, the ratio of the resistance drop after the resistance peak to the peak resistance, and then a weighted sum of the energy ratio and resistance drop ratio.

An edge weld geometry is detected by calculating from the resistance and power curves the weld energy during the period of expulsion, if any, divided by the cumulative energy between the onset of melting and the end of expulsion, a measure of expulsion intensity based on the maximum degree of resistance inflection, and then a weighted sum of the energy value and the inflection value.

6 Claims, 23 Drawing Figures

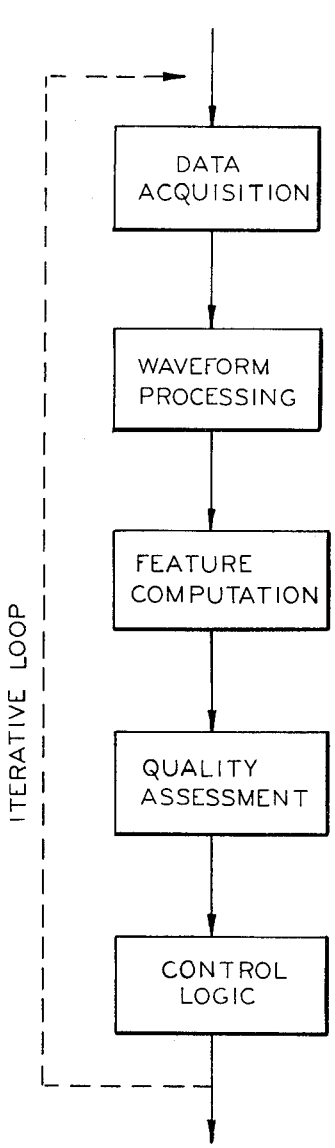
Fig.3
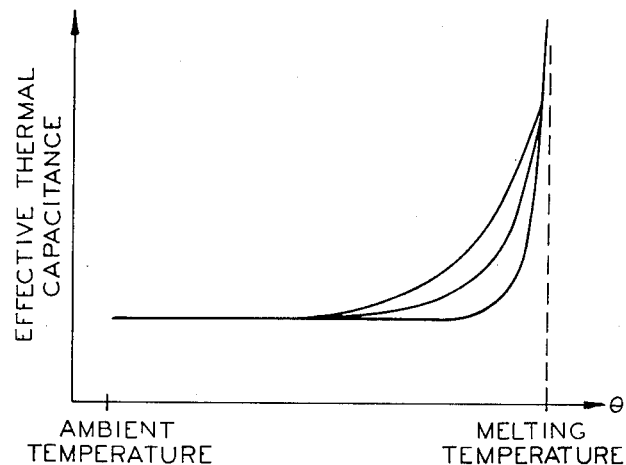
Fig.4
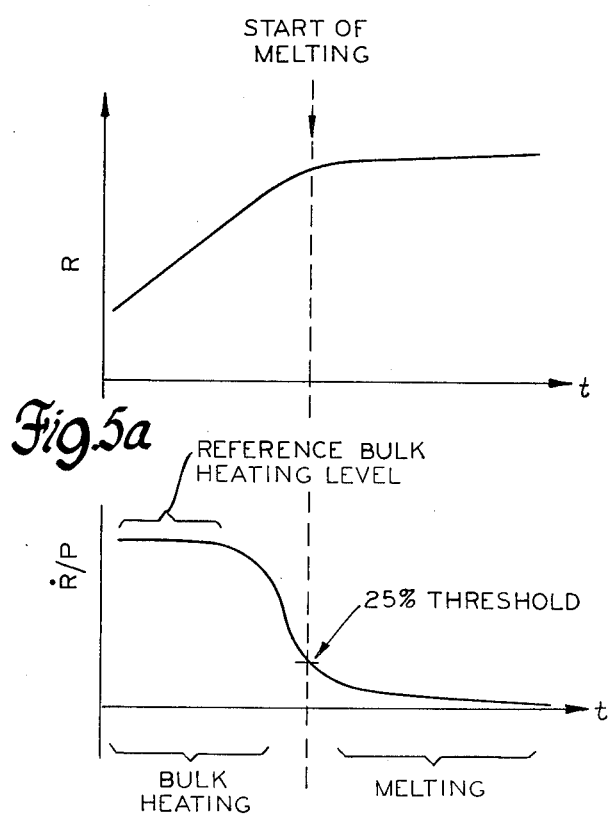
Fig.5a
Fig.5b

METHOD AND APPARATUS FOR DETECTING EDGE WELDS DURING RESISTANCE SPOT WELDING

This invention relates to a method and apparatus for analysis of a resistance spot weld and more particularly for the detection of welds occurring at the edge of a part being welded.

To assure the integrity of spot welded parts it is often the practice to improve weld quality by analyzing welds as they are being made to assist in the proper set up of welding equipment, to utilize ongoing weld analysis throughout the production of welded parts and even to use the weld analysis as a feedback control to the welding equipment for adjusting the applied weld heat or selecting the optimum weld termination for each weld. In the design of such systems it has long been recognized that the weld resistance curve is a useful parameter to monitor for determining the progress of a weld particularly the growth of a weld nugget. Typically during the weld heating phase the resistance curve reaches a maximum and then falls off. The degree of resistance drop has been utilized as a valuable indicator of nugget growth and as a control for the termination of weld. This weld analysis technique and kindred techniques have led to improvements in weld integrity as compared with non-monitored welds. However, due to the many variables encountered in welding conditions, a high percentage of good welds has not been obtained on a regular basis. To compensate for the uncertainty of weld integrity there is a tendency to apply extra welds to a part. This is not only expensive but some parts do not lend themselves to this practice. A given welder may encounter many variables in a single application. Electrode wear or deformation is always a factor to contend with and since a given welder may be used on different regions of a given assembly, it may encounter different kinds of metals, metals with or without zinc coatings, different stack up thicknesses and different numbers of sheets to be welded, for example. The previously known analysis techniques were not adequate to contend with the many variable conditions.

A particular condition which warrants evaluation is an edge weld, i.e. a weld which occurs at the edge of a part being welded. Weld analysis methods may indicate that a given weld is properly formed and thus should be strong, but if the weld is made at the edge of a sheet the nugget may easily pull out of the sheet. Moreover, such an edge weld even if strong, may be unsightly and thus in some applications will be objectionable on aesthetic grounds.

It is therefore an object of this invention to provide a method and apparatus to detect whether a resistance spot weld occurs at an edge of a part being welded.

The method of the invention is carried out by analyzing the weld resistance as the weld is being made to detect a parameter representing the onset of melting, further analyzing the resistance to detect metal expulsion and the beginning and ending points of expulsion, measuring the time between the onset of melting and the end of expulsion and the time between the beginning and ending points, and predicting an edge weld when the ratio of the measured times exceeds a determined value. The invention also contemplates measuring weld power and calculating the weld energy expended during each measured time and predicting an edge weld on the basis of the ratio of the two calculated energy values. The method of the invention further includes measuring expulsion intensity by finding an inflection in the resistance curve during expulsion and determining the degree of inflection by calculating the third derivative of resistance at the inflection point, and predicting an edge weld on the basis of a weighted sum of the degree of inflection and the energy ratio.

The invention is further carried out by monitoring apparatus having sensors for acquiring resistance and power data during the weld formation, and a digital computer for storing the information, the computer being programmed to perform the above methods.

Figure 2:
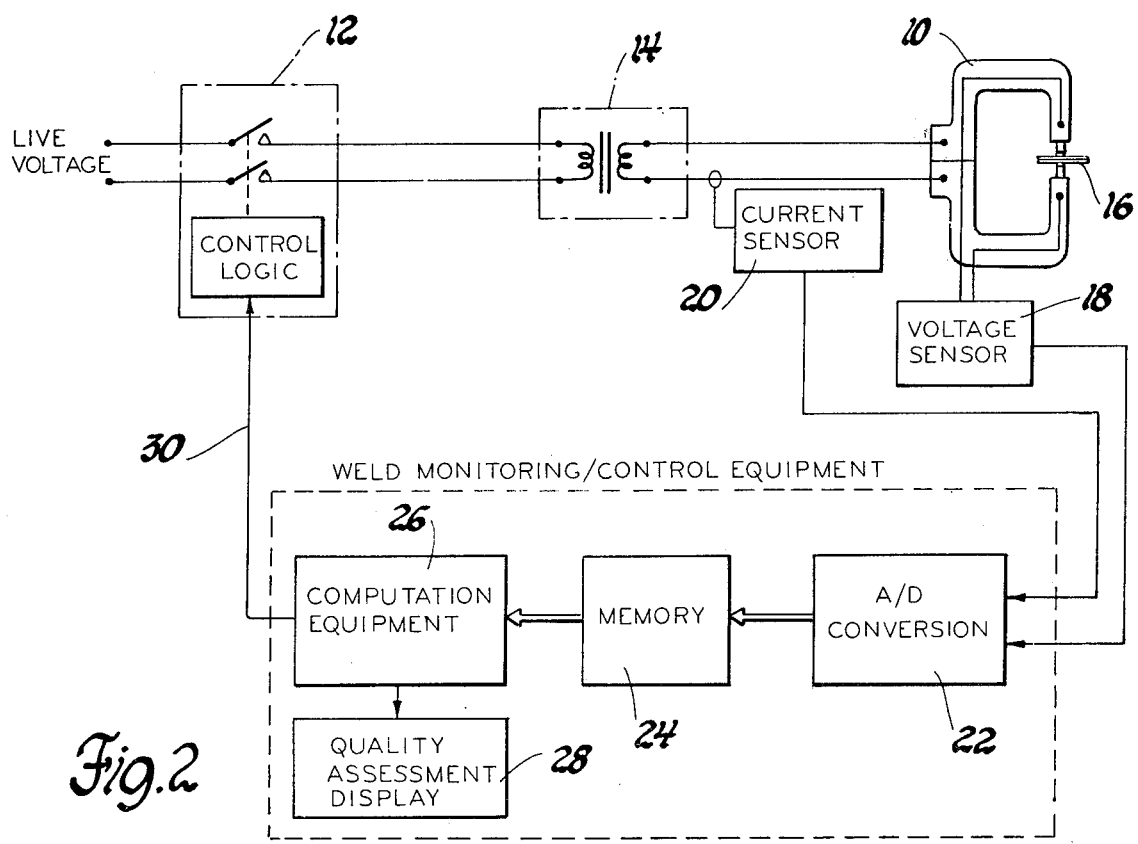
Figure 6A:
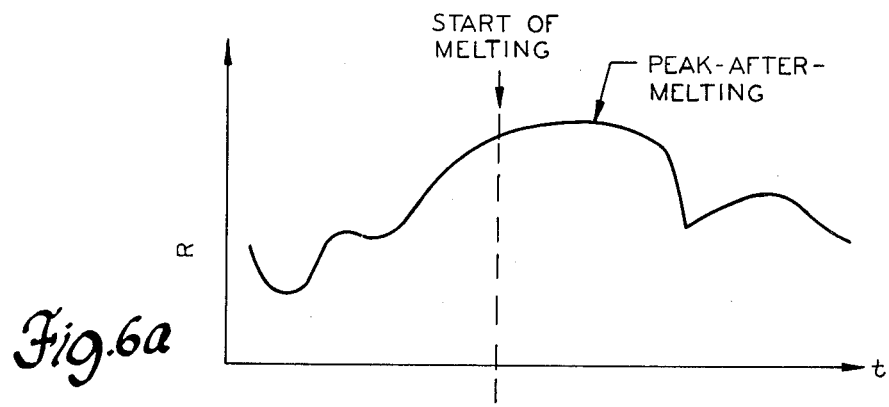
Figure 6B:
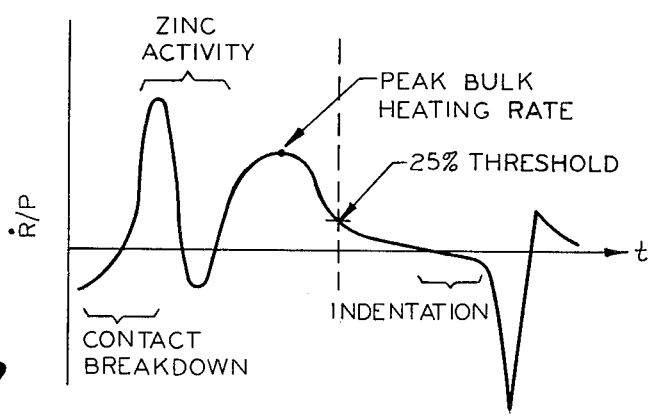
Figure 7:
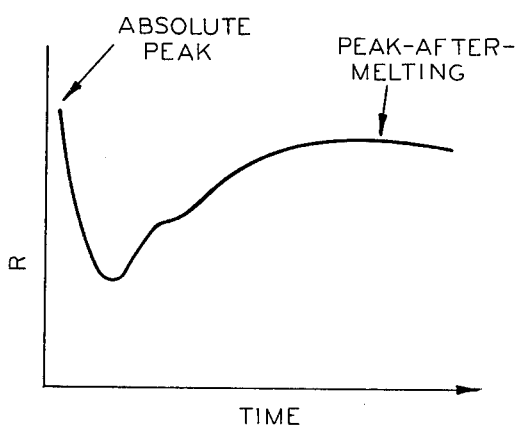
Figure 8:
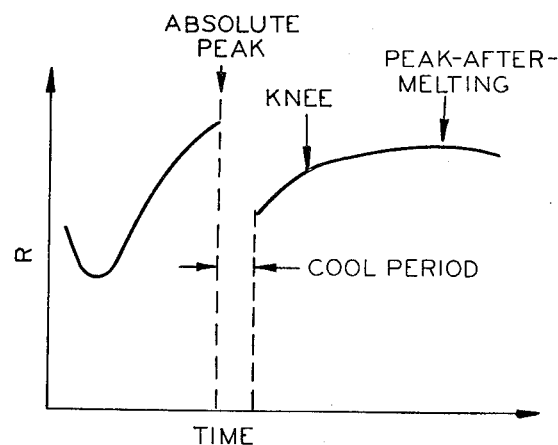
Figure 9:
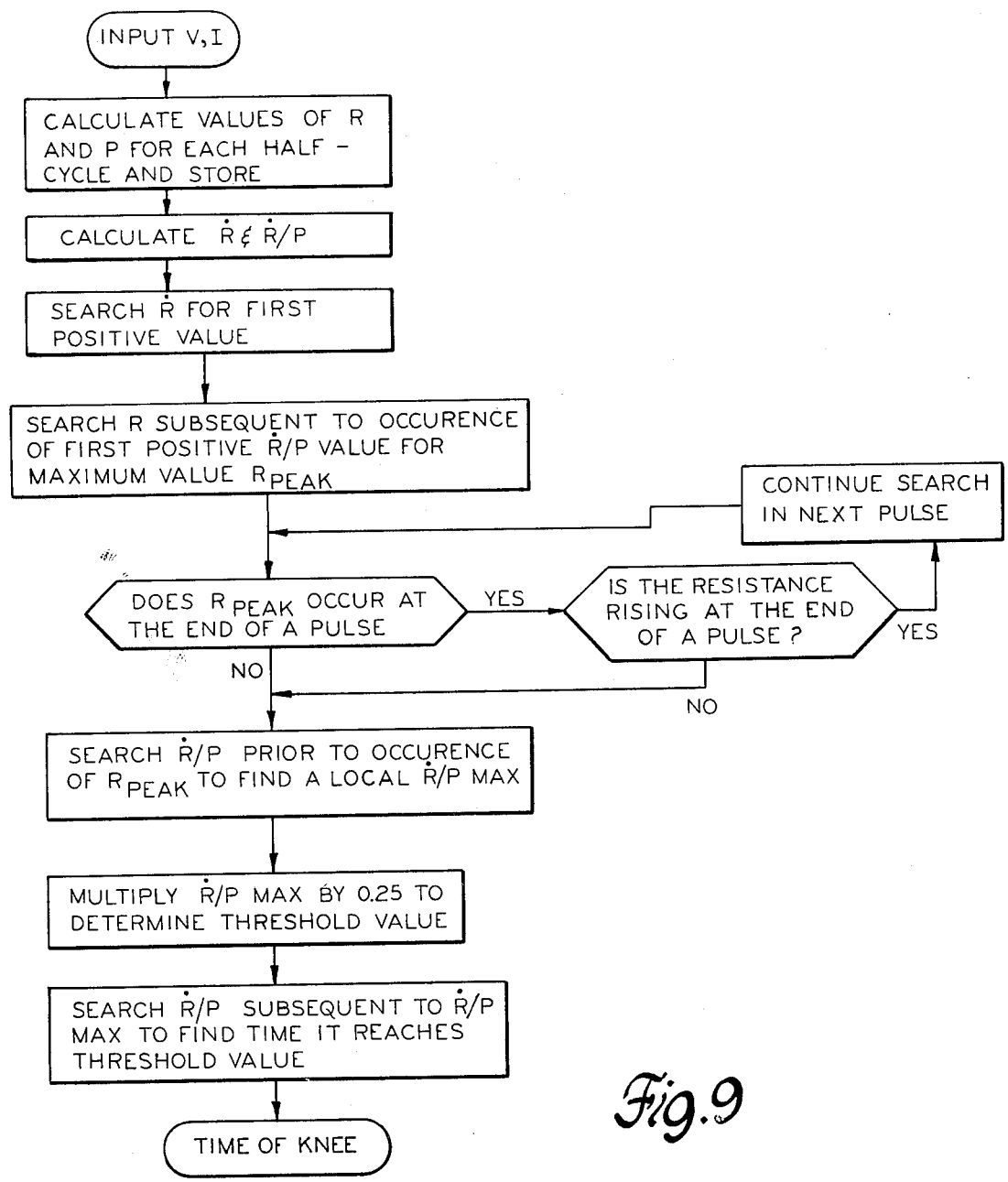
Figure 10:
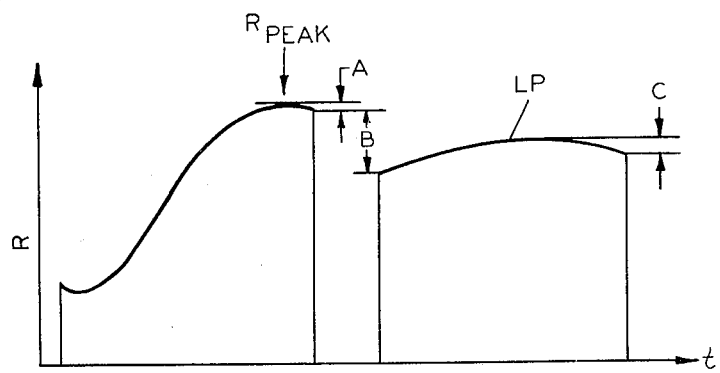
Figure 11:
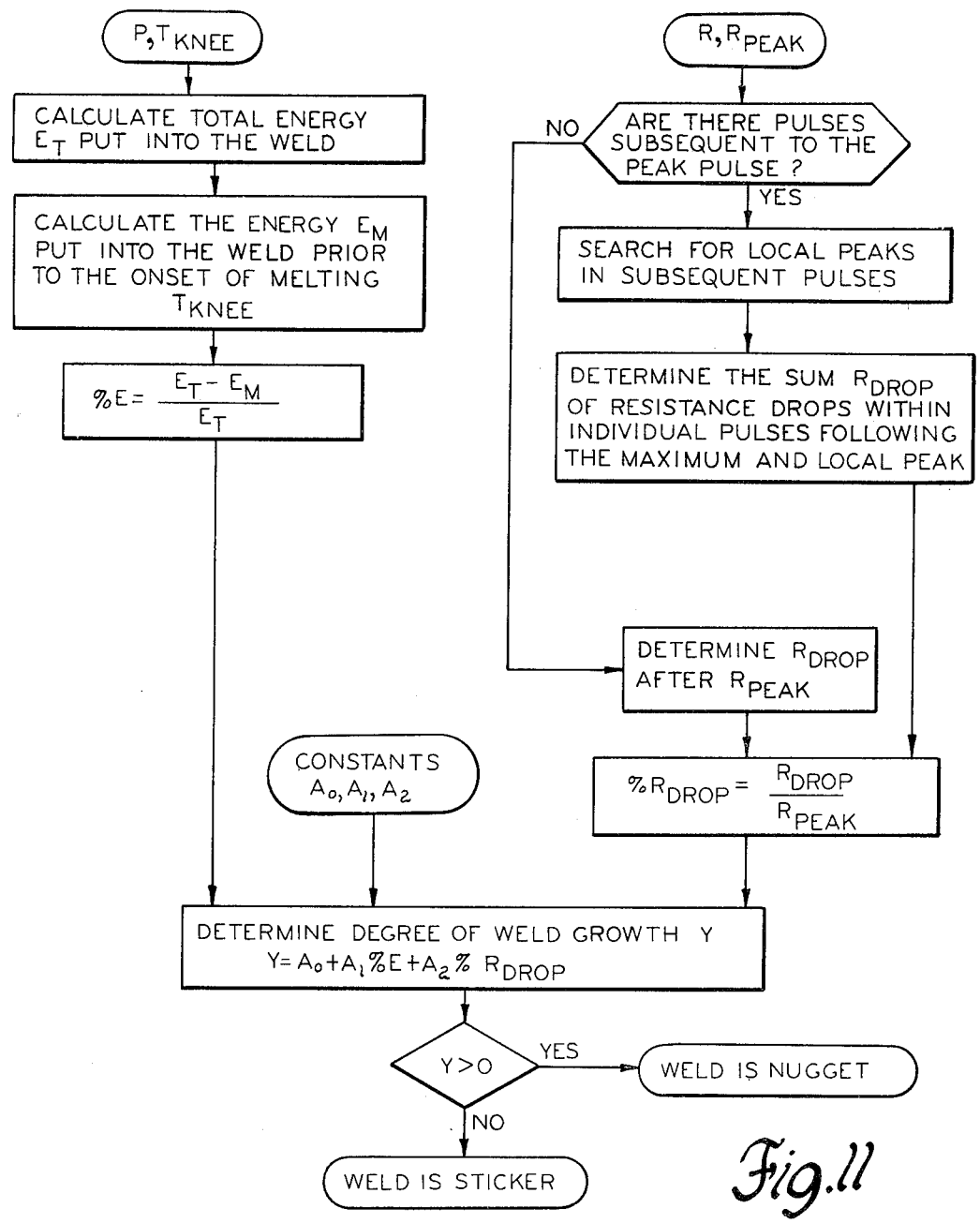
Figure 12A:
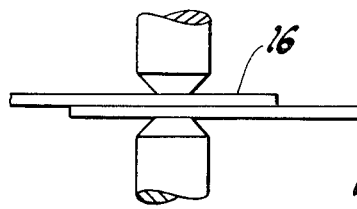
Figure 12B:
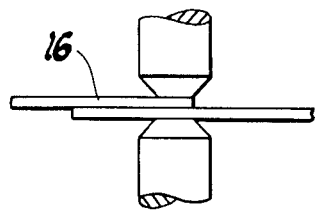
Figure 12C:
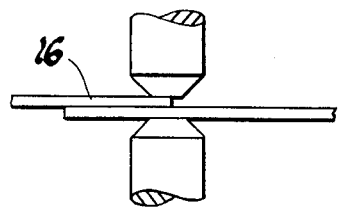
Figure 13A:
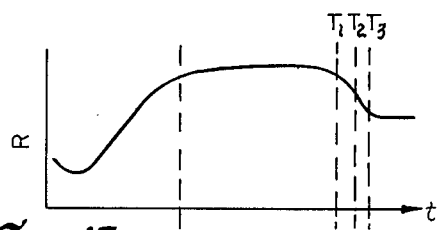
Figure 14A:
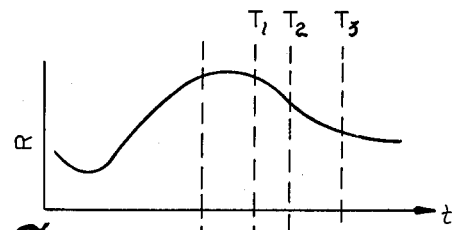
Figure 13B:
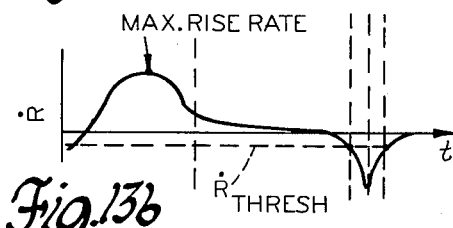
Figure 14B:
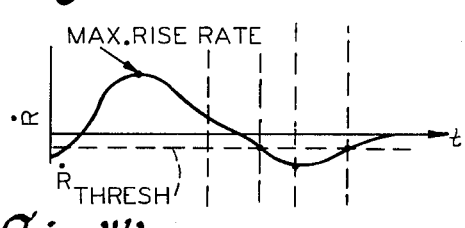
Figure 13C:
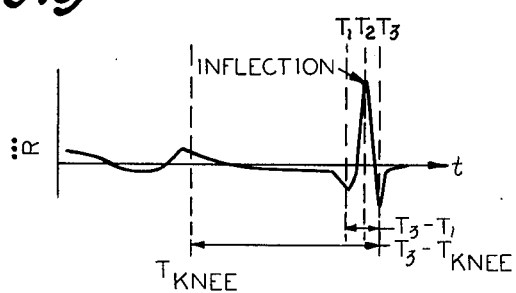
Figure 14C:
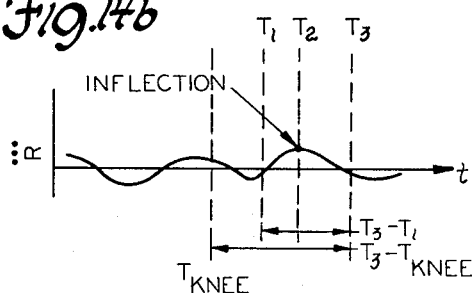
Figure 15:
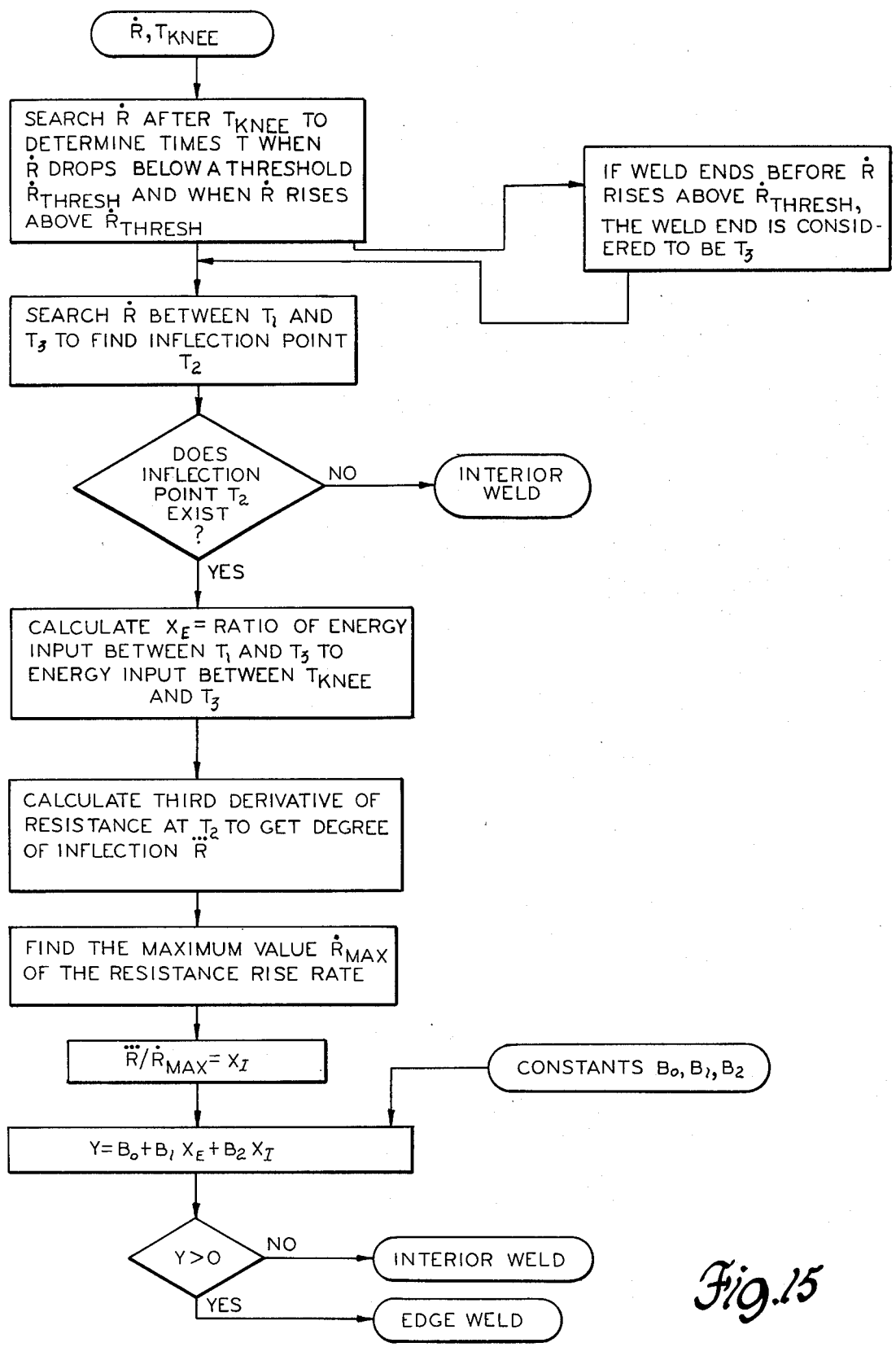

The above and other advantages of the invention will become more apparent from the following description along with the accompanying drawings wherein:

FIG. 1 is a graph of a typical weld resistance curve,

FIG. 2 is a diagram of a welding system with weld monitoring apparatus according to the invention, FIG. 3 is a flow chart of software procedures used for weld monitoring, FIG. 4 is a graph of effective thermal capacitance of the weld volume vs. temperature, FIGS. 5a and 5b are idealized curves for weld resistance and rate of resistance change, FIGS. 6a and 6b are representative curves for weld resistance and rate of resistance change, FIG. 7 is a weld resistance curve illustrating the effect of high initial contact resistance, FIG. 8 is a weld resistance curve illustrating the effect of cool time interruption, FIG. 9 is a flow chart of a computer program for detecting the onset of melting, FIG. 10 is a weld resistance curve illustrating the R drop determination for multipulse welds, FIG. 11 is a flow chart of a computer program for making a nugget/sticker prediction, FIGS. 12a, 12b and 12c are electrode placement diagrams showing interior and edge weld geometries, FIGS. 13a, 13b and 13c are typical weld resistance (R), $\dot{R}$ and $\ddot{R}$ curves respectively for interior welds, FIGS. 14a, 14b and 14c are typical weld resistance (R), $\dot{R}$ and $\ddot{R}$ curves respectively for edge welds, and FIG. 15 is a flow chart of a computer program for making an interior/edge weld prediction.

THE INPUT VARIABLES

The fundamental concept underlying the analysis technique is that the growth of a weld may be tracked with considerable consistency by observing the time histories of the electrical resistance R(t) of the weld, the electrical power P(t) put into the weld, and the cumulative heating energy E(t). FIG. 1 shows a typical R-curve and the aspects of the weld growth which can be monitored from the curve.

Though resistance, power and energy cannot be measured directly, they are derived from the tip voltage v(t) and primary current i(t) which are sensed directly. The preferred procedure for calculating the resistance from continuously sampled measurements on voltage and current is the following least-means-squares approach. The welder circuit is modeled as a series inductance and resistance, and the voltage is therefore expressed as:

$$v = Ri + L\, di/dt + C$$

where
v = voltage
i = current di/dt = current rate of change
R = resistance
L = inductance
C = combination of voltage and current sensor offsets The average value of resistance is computed at each half cycle by performing a least-mean-square regression analysis of i onto v in the above equation. The input values for v and i are obtained by the periodic sampling of the voltage and current sensors, and di/dt is computed by time differencing the current samples. The regression analysis produces values for R, L and C at each half cycle.

The power is given by:

$$P(t) = R(t)i^2(t)$$

and the cumulative energy is given by:

$$E(t) = \int_0^T P(t)dt.$$

To assess weld quality it is first desired to determine whether a weld is a "nugget" or a "sticker". A nugget is a sound weld wherein two or more sheets are thoroughly fused together, and a sticker is a weak weld having a superficial or surfacing joining. A nugget/sticker model is used to distinguish between the two welds. Input values to the system are the weld resistance curve and power curve, or voltage and current data from which the curves are computed. A key feature to be identified is the knee of the resistance curve which roughly corresponds to the onset of melting, or the beginning of nugget formation. The nugget/sticker model uses the ratio of weld energy after the onset of melting to total weld energy as the primary nugget/sticker discriminant, although the percentage resistance drop from the resistance peak is also utilized. Some of the welds thus identified as nuggets may occur at the edge of a sheet and are undesirable because of insufficient strength or because of aesthetic considerations. An interior/edge model is used to discriminate between these conditions. The resistance curve is analyzed to determine whether expulsion of molten metal from the weld occurs. If not, the weld is interior. If there is expulsion, the resistance curve reveals when the expulsion occurs and its intensity. The ratio of weld energy during expulsion to weld energy between the onset of melting and the end of expulsion is a primary edge weld indicator although the expulsion intensity is also significant.

APPARATUS

FIG. 2 shows apparatus to monitor and/or control a spot welder 10. A controller 12 coupled to the welder by a transformer 14 supplies weld current and voltage to steel sheets 16 being welded. Voltage and current sensors 18 and 20 respectively produce analog signals proportional to the welder voltage and current. It is preferred that the voltage sensor leads be placed as close as possible to the welder electrodes (to eliminate the measurement of voltage due to distributed resistance in the gun arm and secondary cables); however, this is not a requirement for satisfactory operation of the monitor/controller. The current sensor may be placed anywhere in either the primary, or secondary circuits of the welder.

Due to the complexity of the computational procedures required to calculate the quality assessment, the welder control signal, and edge discrimination, it is preferred that the monitoring/control apparatus be implemented with digital computation equipment, although alternative computation means may be used to perform the same procedures. Analog-to-digital conversion means 22 sample the voltage and current signals and convert the signals to discrete time waveforms which are stored in the system memory 24. The computational equipment 26 operates on the waveform data to produce the quality and edge assessments, which may be displayed at readout device 28 and/or transmitted to supervisory systems (not shown) and the welder shut-off control signal which is transmitted to the welder control logic via feedback line 30. A Digital Equipment Corporation VAX 11/780 computer with the VMS 3.0 operating system is used to carry out the computations. The computer is programmed according to the program given below which is written in Fortran 77. Alternatively a Motorola 68000 microprocessor based system using a VERSAdos operating system for real time use is programmed with logically equivalent software.

The preferred software procedures for computing the weld quality and determining when to shut the welder off are shown in FIG. 3. The procedure involves an iterative loop whereby data is collected and processed continually as the weld is made. The iteration period is not critical, though it should generally be less than 10% of the average weld time so that the control logic may achieve moderately fine control. For alternating-current welders, it is convenient to execute the loop at half-cycles or full-cycle intervals. For direct-current welders, the iteration period need not be synchronized to welder power.

The data acquisition function digitizes and stores the current and voltage data. The waveform processing function computes the resistance, power and energy curves. The feature computation function searches for the start of melting and computes the percent energy after melting, the percent R-drop and the expulsion energies. The quality assessment logic computes the quality discriminant and the edge discriminant. The optional control logic issues a shut-off command to the welder controller when the quality discriminant function has gotten above the good-weld threshold by a certain percentage.

DETERMINING THE ONSET OF MELTING

Statistical analysis of many test welds has shown that the time at which the knee of the resistance curve occurs is highly significant. The physical interpretation of this identifying marker is that it generally corresponds to the onset of melting.

The procedure for identifying the time that melting begins in a weld is based upon a combination of the following three physical principles:

a. The average temperature $\theta$ of the weld increases as electrical power P is put into the weld:

$$d\theta/dt = P/m \, k_1(\theta) \qquad (1)$$

where m is the mass of the weld and $k_1(\theta)$ is the specific heat of the material being welded (joules/deg/gm). The mass of the weld is given approximately by:

$$m = \rho dA \qquad (2)$$

where $\rho$ is the density (gm/cm$^3$) of the material being welded and d and A are the dimensions of the weld volume. A is taken to be the cross sectional area of the electrode tips and d is the thickness of the stackup.

b. Due to latent heat of fusion, the specific heat $k_1(\theta)$, which is relatively constant for low temperatures, increases rapidly between the solidus and liquidus temperatures. This produces a rapid increase in the effective thermal capacitance of the weld zone. Typical schematic plots of effective thermal capacitance vs $\theta$ are shown in FIG. 4. Because the spatial profile of the temperature is not constant throughout the weld volume, plots of the effective thermal capacitance as a function of average temperature vary somewhat from weld to weld.

c. The electrical resistance R of the material increases approximately linearly as the weld temperature increases:

$$dR/d\theta = k_2 k_3 \quad (3)$$

where $k_2$ (ohm·cm$^2$/cm/deg) is the material's thermal coefficient of electrical conductivity and $k_3$ (cm/cm$^2$) is the weld geometry constant which relates the stackup geometry and the intrinsic material resistance to form the aggregate resistance of the weld. The geometry constant $k_3$ for the resistance is given approximately by:

$$k_3 = d/A \quad (4)$$

The effects of electrode and interfacial contact resistance are not included; it is assumed that contact resistance is negligible during the period when this equation is applied.

Combining equations 1, 2, 3 and 4 yields an expression by which a term inversely proportional to the specific heat of the weld may be computed from the measurable parameters resistance and power. First equation 1 and 2 are multiplied to obtain:

$$\frac{d\theta}{dt} \cdot \frac{dR}{d\theta} = \frac{P}{mk_1(\theta)} k_2 k_3 \quad (5)$$

Note that the $d\theta$'s cancel in equation 5, implying that temperature does not need to be measured explicitly to extract information about the specific heat.

$$\frac{dR}{dt} = \dot{R} = \frac{P}{mk_1(\theta)} k_2 k_3 \quad (6)$$

Next, the stackup property equations 2 and 4 for the weld mass and resistance geometry are substituted into equation 6 to yield:

$$\dot{R} = \frac{P}{\rho d A k_1(\theta)} k_2 \frac{d}{A} \quad (7)$$

Cancelling the distance d and dividing through by the power P gives the inverse specific heat in terms of the resistance rate and electrical power:

$$\dot{R}/P = \frac{k_2}{\rho A^2 k_1(\theta)} \quad (8)$$

The left hand portion of equation 8 is computed at each half cycle during the weld to obtain a time history of inverse specific heat. (The inverse form is computed to maintain mathematical stability of the $\dot{R}/P$ ratio. P is always positive but $\dot{R}$ may be zero or negative.) For welds where the power setting is constant throughout the weld, the value of P may be taken to be constant, and the division by P is not required. In this case, processing is performed directly on the $\dot{R}$ curve.

When the specific heat begins to rise, the $\dot{R}/P$ curve drops correspondingly. The time that melting begins is detected by analyzing the drop in the $\dot{R}/P$ curve. For the present weld monitoring algorithm, a threshold of 25% of the peak value of $\dot{R}/P$ was found empirically to give good weld quality prediction. Thus melting is assumed to begin when the $\dot{R}/P$ curve drops from its peak during bulk heating to a value of 25% of that peak.

The specific values of $\rho$, A and $k_2$, and the value of $k_1$ at low temperatures, need not be known to detect the onset of melting. As long as $\rho$, A and $k_2$ do not vary significantly with respect to the variation in $k_1(\theta)$, all that must be observed is a relative drop in the $\dot{R}/P$ curve indicating the transition in specific heat.

In the original R curve, FIG. 1, the commencement of melting is seen as a transition from the bulk heating rise to the melting plateau, and this point is referred to as the knee of the curve.

Given that the three physical phenomena above were the only ones which impacted the behavior of the resistance curve throughout the history of a weld, a typical R curve would consist, as illustrated in FIG. 5a, only of a rise followed by a flattening after the start of melting. The search for the melting time would then consist of establishing a bulk-heating reference level for $\dot{R}/P$ shown in FIG. 5b during the first several weld cycles and then looking for a drop to 25% of that level.

In fact, however, as illustrated in FIGS. 6a and 6b, several other phenomena may occur which significantly modify the behavior of the R and $\dot{R}/P$ curves. Before melting starts, the effects of contact resistance breakdown at the beginning of the weld generally overshadow the effects of bulk heating, so $\dot{R}$ starts out negative. If the steel is galvanized, the melting and vaporization of zinc, first between the steel sheets and later on between the electrodes and the sheets, superimposes "disturbances" on the R curve which appear as oscillations on the $\dot{R}/P$ curve. After melting starts, indentation and expulsion result in drops in the R curve which cause $\dot{R}/P$ to go negative. The R curves may also rise significantly after expulsion. Additionally, the cool times in multipulse welds introduce discontinuities in the R and $\dot{R}/P$ curves, and no information on these curves is available during the cool times. The search for the start of melting must contain logic to isolate the bulk heating and melting phenomenon from the effects of contact breakdown, zinc coating related oscillations, indentation, expulsion and cool times.

The present procedure for locating the start of melting consists of three major steps. First a search is performed on the R curve to identify the resistance peak-after-melting. With some key exceptions discussed below, this peak is generally the maximum point on the R curve. It occurs after the onset of melting but prior to any indentation or expulsion. The purpose of locating this peak is to remove the effects of indentation and expulsion from the $\dot{R}/P$ curve by placing an upper limit on the search regions for the peak bulk heating rate and for the time of melting. A global search is done throughout the R curve to find the peak. For most welds, the maximum value of the R curve occurs between the melting and indentation phases, and a simple peak detection routine is sufficient to locate the point. There are two important welding conditions, illustrated in FIGS.

7 and 8, which can generate peaks in the R curve that are higher than the peak-after-melting, and the peak detection algorithm must accommodate these phenomena:

1. In welds with low heat in the early half cycles (i.e., welds with upslope or low heat first pulses) the initial contact resistance may be higher than the peak-after-melting. See FIG. 7.
2. In some multi-pulse welds where a cool period begins when the weld is late into bulk heating but the peak-after-melting does not occur until the next pulse, the peak-after melting may not get as high as the resistance value at the end of the prior peak. See FIG. 8.

The procedure to locate the resistance peak consists generally of a search through the R curve for the absolute maximum value of R. Additionally, the following checks are designed into the peak detection algorithm to reject the location of resistance maxima resulting from the phenomena described above.

1. To prevent the false detection of contact breakdown peaks, the peak search routine skips the initial points on the R curve if the curve starts out moving downward. Only when the resistance rate first goes positive does the search begin.
2. If the maximum value of R occurs at the end of a pulse, and R is still rising at the end of the pulse, it is assumed that the peak-after-melting has not yet occurred. This peak is ignored, and, assuming there are additional heat pulses, a new search for another peak is initiated at the beginning of the next pulse. The search region is continually reduced as long as the maximum values occur at the end of a heating pulse.

The second major step of the procedure is establishing the peak bulk heating rate. The peak bulk heating rate is taken to be the local maximum point on the $\dot{R}/P$ curve just prior to the peak in the R curve. This avoids a peak caused by zinc activity as shown in FIG. 6b. Specifically the search finds the global $\dot{R}/P$ peak between the beginning of the weld and the peak after melting. Next, the search proceeds backward, beginning at the time of the peak-after-melting and terminating at the global peak, searching for a local peak which is more likely than the global peak to represent the true bulk heating rate. A local peak is taken to be the peak bulk heating rate if (a) its value is at least a given percentage (50% is recommended) of the global peak value, and (b) there is a local minimum between the global and local peaks which is less than a given percentage (80% is recommended) of the local peak value. The first local peak meeting this criteria is taken to be the true peak bulk heating rate. If no local peak meets the above criteria, the global peak is taken to be the peak bulk heating rate.

The third major step is locating the onset of melting by searching the $\dot{R}/P$ curve, beginning at the time of the peak bulk heating rate, for the point where the curve drops to a specified percentage of the peak bulk heating rate. In practice a threshold of 25% of $\dot{R}/P$ max provides a reliable knee indicator but that threshold value is not critical. For example, if 50% of $\dot{R}/P$ max is used, the time-of-knee changes only a small amount.

The routine for identifying the time-of-knee or onset of melting is summarized in the flowchart of FIG. 9.

THE NUGGET/STICKER MODEL

A weld is predicted to be a nugget if it is observed to progress sufficiently far through its metallurgical growth by the time that heating is terminated. Conversely, it is predicted to be a sticker if insufficient growth is observed. The model does not monitor the solidification of the nugget after the heating period. The model therefore assumes implicitly that there is sufficient hold time for the nugget to complete the solidification process before the electrode pressure is released.

The degree of weld growth is defined by two features. The first feature, %E, is the percentage of the total weld energy that is put into the weld after melting has begun.

The cumulative energy required to get the weld to the beginning of melting is defined to be the reference energy $E_M$ for the weld. The absolute amount of energy required to get to the beginning of melting, or to get to the point of making a nugget, varies considerably as a function of material type, stackup geometry, electrode tip condition, electrode force, and welder heat profiles; however, it has been found empirically that a weld will generally be a nugget if the total energy $E_T$ put into the weld exceeds the melting energy $E_M$ by a given percentage. The following ratio feature is computed by dividing the energy after melting by the total energy in the weld:

$$\% E = \frac{E_T - E_M}{E_T}.$$

%E has proven empirically to be a fairly robust feature in that it varies directly with weld quality, but its value is influenced little by variations in conditions such as material, stackup thickness, tip condition, force, and heat profiles.

The %E feature has the added advantage that it is unitless. Miscalibrations in the voltage or current sensors will not effect the feature values because the calibration constants in the numerator and denominator cancel. The %E feature alone can be the basis of weld quality assessment, however, the accuracy of the model can be improved by incorporating a second feature.

The second feature, %$R_{drop}$, is the percentage drop of the peak of the R curve relative to R peak. Empirical evidence shows a small but significant set of nugget welds which do no exceed the %E threshold but which do show some evidence of indentation in the R curve. This evidence of indentation is an indication that the weld is actually further along in its growth than indicated by the %E feature alone.

A gradual drop in the R curve after the bulk heating rise is generally interpreted as indentation of the welder electrodes into the metal. As the electrodes indent and the distance across the sheets reduces, there is less material impeding current flow, and the resistance drops. Computation of the %$R_{drop}$ feature first involves the location of the resistance peak after the bulk heating rise. The resistance differential between the peak and the lowest point on the R curve subsequent to the peak is the $R_{drop}$. The normalized %$R_{drop}$ feature is the ratio of the drop to the peak value:

$$\%R_{drop} = R_{drop}/R_{peak} \text{ (for single pulse welds).}$$

As is the %E feature, %R$_{drop}$ is unitless, and its value does not depend on precise sensor calibration. Here the multiplier 100 for computing percentage has been omitted in the %E and %R definitions but are accounted for effectively in the model coefficients given below.

The above definition is adequate for single pulse welds. In multipulse welds, however, there are generally significant drops in the resistance during the cool times. Because these drops are not attributable to indentation, the R$_{drop}$ routine contains logic to ignore drops due to interpulse cooling.

FIG. 10 illustrates resistance drop during the cool time. In this example, the resistance peak-after-melting occurs in the first heat pulse. Some drop designated A in the figure, occurs during the first pulse and presumably results from indentation. The drop B, however, results primarily from cooling of the metal, although there may in fact be some continued indentation during the cool time.

After repeated bulk heating in the second pulse, a new local peak LP is achieved and the drop C is evidence of additional indentation. The %R$_{drop}$ feature is taken to be the sum of A plus C divided by R$_{peak}$.

The percent R$_{drop}$ routine takes as its inputs the position and value of R$_{peak}$. Separate resistance drops are then computed for each heat pulse beginning with the one containing the peak-after-melting. For the pulse containing the peak, the R$_{drop}$ is taken to be the difference between the peak value and the lowest point on the R curve subsequent to the peak but within the pulse.

For each subsequent heating pulse, a search is performed to find the maximum resistance within the peak. The R$_{drop}$ for that pulse is taken to be the difference between the peak and the lowest value of R within the pulse after the peak.

The total %R$_{drop}$ for the weld is the sum of the individual drops divided by the peak after melting:

$$\% R_{drop} = \frac{\sum_{peak\ pulse}^{end} R_{drop}(pulse)}{R_{peak}}$$

(for multi-pulse welds)

A discriminant metric y is defined to be a weighted sum of the energy and R$_{drop}$ features:

$$y = A_0 + A_1 \%E + A_2 \%R_{drop}$$

A$_o$ is a constant, A$_1$ and A$_2$ are the model coefficients and are derived empirically from the test data. The model output y is unitless. Useful coefficients for successful weld prediction have been determined to be A$_o$ = −0.53, A$_1$ = 1 and A$_2$ = 7.5. If y is greater than zero, it is predicted that there is sufficient growth of the weld to call it a nugget. Conversely, negative values of y imply a sticker.

The model coefficients A$_1$ and A$_2$ represent the amounts of energy or R$_{drop}$ that must be achieved by a weld to be called a nugget. Mathematically, either the energy or R$_{drop}$ may be sufficient by itself to justify a nugget call, but in practice there is never any R$_{drop}$ without some %E. A combination of energy and R$_{drop}$ may by sufficient for a nugget call though the energy may not be adequate by itself.

The routine for executing the nugget/sticker model is summarized in the flowchart of FIG. 11.

EDGE DETECTION

For this description constant power weld setting is assumed. Thus $\dot{R}$ is utilized rather than $\dot{R}/P$. Of course the power normalization should be utilized where a variable power weld schedule is used. One geometric feature of a weld that may be inferred by observation of the R curve is the location of the electrode tips with respect to the edge of one of the metal sheets being welded. FIG. 12 illustrates three interior vs. edge conditions: (a) an interior condition, where the electrode tips are well inboard of the metal edge, (b) a zero overlap edge condition where one of the tips is fully on the sheet but the edge of the tip is at the edge of the sheet, and (c) a high overlap edge condition where the electrode overlaps the edge of the sheet by approximately 50%.

The procedure presented here to discriminate between edge and interior welds is based upon the observation that the two types of welds expel differently. When (and if) interior welds expel, they generally do so well after melting begins (indicated by the knee of the R curve), and they do so violently. Prior to expulsion, the pool of molten metal is contained by the surrounding solid material. During this time, the R curve remains high even though there may be some small R drop due to electrode tip indentation. When the surrounding solid cam no longer contain the pool of molten metal, the weld expels. At this time, the pool squirts out within one or two half cycles causing a violent step-like drop in the R curve.

By comparison to interior welds, edge welds expel more gently. When the electrode overlaps the edge of one of the metal sheets, melting occurs at this edge, and there is no solid metal at the edge to contain the molten metal. The molten metal escapes, i.e., expels, continuously as it melts. The R curve therefore begins to drop as soon as the melting begins, and this drop is generally more continuous, long term, and more gradual than the instantaneous drops observed in interior welds.

Typical examples of R curves from interior welds are shown in FIGS. 13a, 13b and 13c. The top trace FIG. 13a shows the raw resistance curve R(t). The second curve FIG. 13b is the first time derivative of R(t), the resistance rate $\dot{R}$. The third trace FIG. 13c is the third derivative, the resistance inflection $\dddot{R}$.

FIGS. 14a, 14b and 14c show corresponding curves for edge welds.

In order to quantify the above edge phenomenon for purposes of discriminating edge and interior conditions, four timing pointers are defined:

(1) T$_{knee}$: The time that melting begins.
(2) T$_1$: The time, after the resistance peak, where the resistance rate first drops below a threshold $\dot{R}_{thresh}$. This event is intended to indicate the beginning of expulsion, i.e., the escape of molten metal. The threshold is set sufficiently negative that small resistance drops due to plastic deformation of solid metal will not trigger the event, but it is high enough that molten metal extruding from low-heat edge welds will trigger the event. (A threshold value of −0.83 microohms per half cycle is adequate for 60 Hz welders operating on steel with stackup thickness between 75 and 150 mils.)
(3) T$_3$: The time, after T$_1$, where the resistance rate first rises back above the rate threshold. This event is intended to indicate the end of the first expulsion. (Multiple expulsions may occur, particularly in the multiple stackups. Typically the first expulsion results from the edge geometry and the later ones are interior expulsions between the fully overlapped sheets. To detect an edge geometry, it is necessary to isolate and evaluate the first expulsion). $T_3$ is not computed if $T_1$ does not exist. If $T_1$ exists, but the weld is terminated before the resistance rate rises back above the rate threshold, $T_3$ is taken to occur at the end of the weld.

(4) $T_2$: The time, between $T_1$ and $T_3$, where the resistance drop rate peaks, i.e., is most negative. This event is the inflection point of the resistance drop, and it is intended to indicate when the expulsion rate of molten metal is maximum.

Edge weld expulsions last a relatively long time ($T_1$ to $T_3$) with respect to interior expulsions, and they "begin" relatively much earlier ($T_{knee}$ to $T_1$) after the knee than do interior expulsions. Expressed another way, edge welds are in the process of expelling a greater percentage of the melting period between the knee and the completion of expulsion than are interior welds. See FIGS. 13 and 14. This gives rise to a candidate time feature:

$$x_T = \frac{T_3 - T_1}{T_3 - T_{knee}}$$

The normalization resulting from the ratio in this time feature renders it somewhat insensitive to the overall speed of the weld, but the existence of cool times between pulses or varying heat rate between or within pulses could offset the feature. More fundamental than how much time is taken to progress from one event to the next is how much weld energy is absorbed by the weld during this period. Thus differential energies are substituted for differential times to obtain the energy feature:

$$x_E = \frac{EE(T_1 \text{ to } T_3)}{EE(T_{knee} \text{ to } T_3)}$$

The degree of inflection, i.e., the third derivative of R at the time of the maximum drop rate, shows how "steplike" the expulsion is, so it gives an indication of how "violent" the resistance drop is. The inflection feature is defined as the third derivative of the resistance curve at the inflection point $T_2$. FIGS. 13c and 14c show the $\dddot{R}$ curve for the entire weld time, however the value of $\dddot{R}$ is required only for time $T_2$. It is computed by taking the second derivative of the $\dot{R}$ curve at time $T_2$. To render the feature independent of calibration scale factors on the voltage and current sensors, and to eliminate sensitivity to different rates of overall weld growth $\dddot{R}$ is normalized by the maximum resistance rise rate $\dot{R}_{max}$:

$$x_I = \dddot{R}/\dot{R}_{max}$$

Thus the inflection feature $x_I$ has the units of inverse time squared.

A flowchart of the edge detection procedure is shown in FIG. 15. There are two stages in the decision process. First, if no inflection point is found to exist after the peak in the R curve, the weld is called interior. An underlying assumption here is that the weld had at least 50% of its energy after the knee. This assumption is well founded because 50% energy after the knee is generally required to make a nugget. Because edge welds generally begin expelling very soon after the knee, welds are called interior if they go to completion without an expulsion inflection.

Second, given that an inflection point has occurred, the edge/interior decision is based on a linear combination of the energy and inflection features:

$$y = B_0 + B_1 x_E + B_2 x_I$$

where $B_0$, $B_1$ and $B_2$ are coefficient values which determine the threshold for the energy and inflection features $x_E$ and $x_I$. Values of $B_0 = 1$, $B_1 = 1/0.36$ and $B_2 = 1/1.50$ have been found empirically to be effective for welding steel stackups with thicknesses between 75 and 150 mils.

If y is positive, the weld is called interior (i.e., good), and, if negative, the weld is called edge.

It will thus be seen that based upon the weld/nugget discrimination and the edge detection method described herein, both of which rely on the identification of the resistance curve knee, useful techniques are disclosed for assessing and/or controlling weld quality with a high degree of confidence. It will also be seen that apparatus is revealed for detecting the resistance knee and carrying out the weld analysis methods using digital computers programmed according to the disclosed routines.

The embodiments of the invention in which an exclusive property or privilege is claimed are defined as follows:

1. The method of monitoring a resistance spot weld and determining whether the weld occurs at the edge of a sheet, comprising the steps of:
   measuring the weld resistance as the weld is being made,
   analyzing the resistance to detect a parameter representing the onset of melting,
   detecting expulsion time by searching for first and second points marking the beginning and end of expulsion respectively, the points occurring after the onset of melting when the rate of resistance change drops below a preset threshold and then increases above the threshold respectively, and measuring the time between the first and second points,
   measuring the time between the onset of melting and the end of expulsion,
   searching the rate of resistance change between the first and second points for an inflection point in the resistance drop, and
   predicting an edge weld when an inflection is present and the ratio of the expulsion time to the time from the onset of melting to the end of expulsion exceeds a specified value.

2. The method of monitoring a resistance spot weld and determining whether the weld occurs at the edge of a sheet, comprising the steps of:
   measuring the weld resistance and power as the weld is being made,
   differentiating the resistance to obtain the rate of resistance change,
   detecting a parameter representing the onset of melting from the rate of resistance curve,
   detecting expulsion time by searching for first and second points marking the beginning and end of expulsion respectively, the points occurring after the onset of melting when the rate of resistance change drops below a preset threshold and then increases above the threshold respectively, and measuring the time between the first and second points, searching between the first and second points for an inflection in the rate of resistance change, indicating when the resistance drop rate is a maximum, calculating the cumulative weld energy between the onset of melting and the end of expulsion, calculating the weld energy during the expulsion time, and predicting an edge weld when an inflection is present and the ratio of weld energy during expulsion time to cumulative weld energy exceeds an empirical threshold.

3. The method of monitoring a resistance spot weld and determining whether the weld occurs at the edge of a sheet, comprising the steps of:

measuring the weld resistance and power as the weld is being made, differentiating the resistance to obtain the rate of resistance change, detecting a parameter representing the onset of melting from the rate of resistance curve, detecting expulsion time by searching for first and second points marking the beginning and end of expulsion respectively, the points occurring after the onset of melting when the rate of resistance change drops below a preset threshold and then increases above the threshold respectively, measuring the time between the first and second points, searching the rate resistance change curve to determine the maximum rate of resistance rise, searching the rate of resistance change between the first and second points for an inflection point in the resistance drop indicating when the resistance drop rate is a maximum, determining the degree of inflection by calculating the third derivative of resistance at the inflection point, dividing the degree of inflection by the maximum rate of resistance rise to derive a normalized inflection value, calculating the cumulative weld energy between the onset of melting and the end of expulsion, calculating the weld energy during the expulsion time, determining the normalized expulsion energy by calculating the ratio of the weld energy during the expulsion time to the cumulative weld energy, and combining weighted values of the normalized expulsion energy and the normalized inflection value to obtain a result predicting an edge weld provided an inflection is present, wherein a relatively large weld energy during expulsion time and a relatively small degree of inflection are indicative of an edge weld.

4. The method of detecting whether a resistance spot weld occurs at the edge of a sheet comprising the steps of:

measuring the weld voltage and current, determining the weld resistance and weld energy from the measured voltage and current, differentiating the resistance to obtain the first derivative thereof, determining from the said first derivative of the resistance the time $T_0$ of the onset of melting, determining from the first derivative of resistance $\dot{R}$ the time $T_1$ when $\dot{R}$ drops below a threshold, the threshold being empirically chosen to signify the beginning of expulsion of metal from the weld, and the time $T_3$ when $\dot{R}$ rises above the threshold, calculating the ratio of energy input to the weld between $T_1$ and $T_3$ to the cumulative energy between the onset of melting $T_0$ and $T_3$, determining the time $T_2$ of the inflection point of $\dot{R}$ between $T_1$ and $T_3$, calculating the third derivative of resistance $\dddot{R}$ at time $T_0$ to determine the degree of inflection $\dddot{R}$, finding the maximum value $\dot{R}_{max}$ of the resistance rise rate, calculating the inflection ratio $\dddot{R}/\dot{R}_{max}$, and calculating a weighted sum of the energy ratio and the inflection ratio wherein an edge weld is present when metal expulsion is detected and the weighted sum has a value in an empirically determined range.

5. Weld monitoring apparatus for determining whether a resistance spot weld occurs at the edge of a sheet comprising:

means for acquiring data representing the weld resistance curve, and digital computer means for storing the acquired data, said computer means being programmed to:

differentiate the resistance to obtain the rate of resistance change, detect a parameter representing the onset of melting from the rate of resistance curve, detect expulsion time by searching for first and second points marking the beginning and end of expulsion respectively, the points occurring after the onset of melting when the rate of resistance change drops below a preset threshold and then increases above the threshold, respectively, measure the time between the first and second points, measure the time between the onset of melting and the end of expulsion, search the rate of resistance change between the first and second points for an inflection point in the resistance drops, and predict an edge weld when an inflection is present and the ratio of the expulsion time to the time from the onset of melting to the end of expulsion exceeds a specified value.

6. Apparatus for monitoring a resistance spot weld for determining whether a weld occurs at the edge of a sheet comprising:

means for acquiring data representing the wedl power and resistance curves, and digital computer means for storing the acquired data, said computer means being programmed to:

differentiate the resistance to obtain the rate of resistance change, detect a parameter representing the onset of melting from the rate of resistance curve, detect expulsion time by searching for first and second points marking the beginning and end of expulsion respectively, the points occurring after the onset of melting when the rate of resistance change drops below a preset threshold and then increases above the threshold, respectively, measure the time between the first and second points, search the rate resistance change curve to determine the maximum rate of resistance rise, search the rate of resistance change between the first and second points for an inflection point in the resistance drop indicating when the resistance drop rate is a maximum, determine the degree of inflection by calculating the third derivative of resistance at the inflection point, divide the degree of inflection by the maximum rate of resistance rise to derive a normalized inflection value, calculate the cumulative weld energy between the onset of melting and the end of expulsion, calculate the weld energy during the expulsion time, determine the normalized expulsion energy by calculating the ratio of the weld energy during the expulsion time to the cumulative weld energy, and combine weighted values of the normalized expulsion energy and the normalized inflection value to obtain a result predicting an edge weld provided an inflection is present, wherein a relatively large weld energy during expulsion time and a relatively small degree of inflection are indicative of an edge weld.

* * * * *

UNITED STATES PATENT AND TRADEMARK OFFICE
CERTIFICATE OF CORRECTION

PATENT NO. : 4,477,709

DATED : October 16, 1984

INVENTOR(S) : Dixon Cleveland, James R. Havens, et al

Page 1 of 27

It is certified that error appears in the above-identified patent and that said Letters Patent is hereby corrected as shown below:

Column 10, line 27, "cam" should read -- can --.

Column 11, line 50, "R" should read -- $\dot{R}$ --.

Column 12, following line 26, insert a computer program listing comprising 26 computer printout pages as per attached sheets.

Column 14, line 50, "wedl" should read -- weld --.

Signed and Sealed this

Twenty-third Day of July 1985

[SEAL]

*Attest:*

DONALD J. QUIGG

*Attesting Officer*   Acting Commissioner of Patents and Trademarks

```
C
C
C Declarations
C ─────────
C
C *,**     WELDLENGTH - length of weld, including cool times, in units of
C                    halfcycles.
C  *   R - sequence of points from the resistance curve (R-curve) (defined
C            from 1 to WELDLENGTH).
C      RD - sequence of points from the first derivative of the R-curve
C            (R-DOT curve) (defined from 1 to WELDLENGTH).
C            May be redefined to be R-DOT/POWER curve if RDOTBYPOWERFLAG
C            is TRUE.
C  *   EE - sequence of points from the electrical energy curve (defined
C            from 1 to WELDLENGTH).
C      CEE - sequence of points from the cummulative electrical energy curve
C            (defined from 1 to WELDLENGTH).
C **   NUMBEROFPULSES - number of pulses within a weld.
C **   BEGINOFPULSES - sequence of points specifying the beginning halfcycle
C                    of each pulse (defined from 1 to NUMBEROFPULSES).
C **   ENDOFPULSES - sequence of points specifying the end halfcycle
C                    of each pulse (defined from 1 to NUMBEROFPULSES).
C **   TIMEOFPEAK - point of R-curve peak.
C **   TIMEOFKNEE - point of R-curve knee.
C **   TIMEOFRISE - point of maximum R-rise rate.
C **   TIMEOFP1 - point of phenomenon 1 (-1 if it does not exist).
C **   TIMEOFP2 - point of phenomenon 2 (-1 if it does not exist).
C **   TIMEOFP3 - point of phenomenon 3 (-1 if it does not exist).
C ***  RDOTBYPOWERFLAG - first derivative of R-curve flag:
C                        TRUE - if R-DOT/POWER curve is to be used,
C                        FLASE - if R-DOT curve is to be used.
C     PERCENTEE - percent electrical energy after the R-curve knee parameter.
C     PERCENTDROP - percent R-drop parameter.
C     EXPULSIONENERGY - expulsion energy parameter.
C     INFLECTION - inflection parameter.
C     NSMODELOUTPUT - result of nugget/sticker model.
C     IEMODELOUTPUT - result of interior/edge model.
C
C
C
C
C
C      *   - must be provided
C      **  - integer (real if not marked)
C      *** - logical
```

```
C
C
C Modules
C ──────
C
C      RDOT - computes the first derivative of the R-curve (RD) given the
C             R-curve (R).
C      CUMENERGY - computes the cummulative electrical energy (CEE) given
C                  the electrical energy (EE).
C      GETTIMES - finds the time of the R-curve peak (TIMEOFPEAK),
C                 time of the R-curve knee (TIMEOFKNEE),
C                 time of the maximum R-rise rate (TIMEOFRISE),
C                 time of phenomenon 1 (TIMEOFP1),
C                 time of phenomenon 2 (TIMEOFP2) and
C                 time of phenomenon 3 (TIMEOFP3).
C      PARAM - computes the model parameters (PERCENTEE, PERCENTDROP,
C              EXPULSIONENERGY and INFLECTION) given the key times
C              (TIMEOFPEAK, TIMEOFKNEE, TIMEOFRISE, TIMEOFP1,
C              TIMEOFP2 and TIMEOFP3).
C      NSMODEL - computes the nugget/sticker model output given the parameters
C                PERCENTEE and PERCENTDROP.
C -    IEMODEL - computes the interior/edge model output given the parameters
C -              TIMEOFP2, EXPULSIONENERGY and INFLECTION.
C      RCOOL - determines whether or not an R-curve index is in the cool time.
C      RDCOOL - determines whether or not a first derivative of R-curve
C               index is in the cool time.
C      FIXTIME - converts a possibly invalid time on the first derivative
C                of R-curve to a valid one.
C      FINDPEAKS - finds negative R-DOT peaks for use in calculating time
C                  parameters.
C      R3DOT - computes the third derivative of R, at a single point, given
C              the first derivative of R (RD).
C      GETPULSES - finds the beginning and ending half-cycles of each pulse
C                  given the R-curve.
C      RDOTBYPOWER - computes the R-DOT/POWER curve and stores it in RD
C                    given the R-DOT curve (RD) and the electrical energy
C                    curve (EE).
```

```
C
C
C Overall Procedure
C ─────────────────
C
C
C Note
C ────
C     The following should be previously defined or available:
C           WELDLENGTH, R, EE and RDOTBYPOWERFLAG.
C
C
C
C
C Procedure for calculating model outputs
C ───────────────────────────────────────
C
C     1) Find NUMBEROFPULSES, BEGINOFPULSES and ENDOFPULSES via
C        module GETPULSES.
C     2) Compute RD via module RDOT.
C        If desired, compute R-DOT/POWER via module RDOTBYPOWER and store
C        in RD.
C     3) Compute CEE via module CUMENERGY.
C     4) Compute TIMEOFPEAK, TIMEOFKNEE, TIMEOFRISE, TIMEOFP1,
C        TIMEOFP2 and TIMEOFP3 via module GETTIMES.
C     5) Compute PERCENTEE, PERCENTDROP, EXPULSIONENERGY and INFLECTION
C        via module PARAM.
C     6) Compute NSMODELOUTPUT via module NSMODEL.
C     7) Compute IEMODELOUTPUT via module IEMODEL.
C
C     BEGIN MAIN PROGRAM
C
      INTEGER WELDLENGTH,BEGINOFPULSES(10),
     $             ENDOFPULSES(10),TIMEOFPEAK,TIMEOFKNEE,
     $             TIMEOFRISE,TIMEOFP1,TIMEOFP2,TIMEOFP3
      INTEGER FVOFF
      REAL INFLECTION,NSMODELOUTPUT,IEMODELOUTPUT
      DIMENSION INT(51),REEL(46),R(300),RD(300),AE(300,6),EE(300),
     $             CEE(300),FV(206)
      CHARACTER*12 INTHEAD,FRDOT
      CHARACTER*60 ALPHA
      LOGICAL RDOTBYPOWERFLAG
C
      TYPE 2000
      ACCEPT 2005, INTHEAD
      TYPE 2015
      ACCEPT 2005, FRDOT
      TYPE 2010
      ACCEPT *, PRINTTHRESHOLD
      IF(INTHEAD(1:5).EQ.'SHORT') THEN
            NREEL = 18
            FVOFF = 0
            NFV = 178
```

```
      ELSE
            NREEL = 46
            FVOFF = 28
            NFV = 206
      END IF
      IF(FRDOT(1:11).EQ.'R-DOT/POWER') THEN
            RDOTBYPOWERFLAG = .TRUE.
      ELSE
            RDOTBYPOWERFLAG = .FALSE.
      END IF
C
      OPEN(UNIT=1,STATUS='OLD',READONLY,SHARED,FORM='UNFORMATTED')
      OPEN(UNIT=2,STATUS='OLD',RECORDTYPE='FIXED',RECORDSIZE=NFV,
     $            FORM='UNFORMATTED')
C
      IC = 0
      WRITE(6,6000)
    5 CONTINUE
      DO 8 I = 1,46
            REEL(I) = 0.0
    8 CONTINUE
      READ(1,END=500) INT,ALPHA,(REEL(I),I=1,NREEL)
      NCHAN = INT(3)
      NAE = NCHAN-2
      READ(1) ICHAN,IREC,WELDLENGTH,SAMPL,(R(I),I=1,WELDLENGTH)
      DO 10 J = 1,NAE
            READ(1) ICHAN,IREC,WELDLENGTH,SAMPL,
     $                  (AE(I,J),I=1,WELDLENGTH)
   10 CONTINUE
      READ(1) ICHAN,IREC,WELDLENGTH,SAMPL,(EE(I),I=1,WELDLENGTH)
C
      READ(2) (FV(I),I=1,NFV)
      IC = IC+1
C
      IF(INT(48).LT.0) GO TO 100
C
      NUMBEROFPULSES = INT(23)
      BEGINOFPULSES(1) = INT(24)
      ENDOFPULSES(1) = INT(25)
      BEGINOFPULSES(2) = INT(29)
      ENDOFPULSES(2) = INT(30)
      DO 15 I = 3,NUMBEROFPULSES
            IOFF = (I-3) * 5
            BEGINOFPULSES(I) = IFIX(REEL(33+IOFF))
            ENDOFPULSES(I) = IFIX(REEL(34+IOFF))
   15 CONTINUE
C
C     RECOMPUTE NEW BEGIN AND END OF PULSES
C
C------------------------------------------------------------
C------------------------------------------------------------
C
C     ACTUAL CALL SEQUENCE FOR IMPLEMENTATION (ONLY R, EE, WELDLENGTH
```

```
C       AND RDOTBYPOWERFLAG NEED BE PROVIDED)
C
        CALL GETPULSES(R,WELDLENGTH,NUMBEROFPULSES,BEGINOFPULSES,
     $                 ENDOFPULSES)
        CALL RDOT(WELDLENGTH,R,NUMBEROFPULSES,BEGINOFPULSES,
     $            ENDOFPULSES,RD)
        IF(RDOTBYPOWERFLAG) THEN
             CALL RDOTBYPOWER(WELDLENGTH,RD,EE,NUMBEROFPULSES,
     $                        BEGINOFPULSES,ENDOFPULSES)
        END IF
        CALL CUMENERGY(WELDLENGTH,EE,CEE)
        CALL GETTIMES(WELDLENGTH,R,RD,NUMBEROFPULSES,BEGINOFPULSES,
     $                ENDOFPULSES,RDOTBYPOWERFLAG,TIMEOFPEAK,
     $                TIMEOFKNEE,TIMEOFRISE,TIMEOFP1,TIMEOFP2,
     $                TIMEOFP3)
        CALL PARAM(WELDLENGTH,R,RD,CEE,TIMEOFPEAK,TIMEOFKNEE,
     $             TIMEOFRISE,TIMEOFP1,TIMEOFP2,TIMEOFP3,
     $             NUMBEROFPULSES,BEGINOFPULSES,ENDOFPULSES,
     $             PERCENTEE,PERCENTDROP,EXPULSIONENERGY,INFLECTION)
        CALL NSMODEL(PERCENTEE,PERCENTDROP,NSMODELOUTPUT)
        CALL IEMODEL(TIMEOFP2,EXPULSIONENERGY,INFLECTION,
     $               IEMODELOUTPUT)
C
C       END OF CALL SEQUENCE FOR IMPLEMENTATION
C
C-------------------------------------------------------------
C-------------------------------------------------------------
C
C       WRITE TEST WELDS
C
        IF(INT(1).EQ.12.AND.INT(2).EQ.2) THEN
             WRITE(6,6010) WELDLENGTH
             WRITE(6,6015) 'RESISTANCE CURVE',(R(I),I=1,WELDLENGTH)
             WRITE(6,6015) 'ELECTRICAL ENERGY CURVE',
     $                               (EE(I),I=1,WELDLENGTH)
             WRITE(6,6020) NUMBEROFPULSES
             WRITE(6,6025) 'BEGINOFPULSES',
     $                               (BEGINOFPULSES(I),I=1,NUMBEROFPULSES)
             WRITE(6,6025) 'ENDOFPULSES',
     $                               (ENDOFPULSES(I),I=1,NUMBEROFPULSES)
             WRITE(6,6015) FRDOT,(RD(I),I=1,WELDLENGTH)
             WRITE(6,6015) 'CUMMULATIVE EE CURVE',
     $                               (CEE(I),I=1,WELDLENGTH)
             WRITE(6,6030) TIMEOFPEAK,TIMEOFKNEE,TIMEOFRISE,
     $                     TIMEOFP1,TIMEOFP2,TIMEOFP3,
     $                     PERCENTEE,PERCENTDROP,EXPULSIONENERGY,
     $                     INFLECTION,NSMODELOUTPUT,IEMODELOUTPUT
        END IF
C
        TNSOUTPUT = -0.53 + FV(FVOFF+123) + 7.5*FV(FVOFF+129)
        IF(FV(FVOFF+135).LE.0.0) THEN
             TIEOUTPUT = 1.0
        ELSE
```

```
              TIEOUTPUT = 1.0 - (1./.36)*FV(FVOFF+173)
     $                       + (1./1.5)*FV(FVOFF+158)
         END IF
 100  CONTINUE
      GO TO 5
 500  CONTINUE
      STOP 'MODEL -- NORMAL STOP'
2000  FORMAT(1H ,'IS THE INTERMEDIATE DB HEADER SHORT OR LONG ? ',$)
2005  FORMAT(A12)
2010  FORMAT(1H ,'ENTER PRINTING THRESHOLD: ',$)
2015  FORMAT(1H ,'WHICH CURVE (R-DOT OR R-DOT/POWER) SHOULD ',
     $           'BE USED ? ',$)
6000  FORMAT(1H1)
6010  FORMAT(1H1,'LENGTH OF WELD = ',I5,' HALF-CYCLES')
6015  FORMAT(/1H ,A30,30(/1H ,10G13.5))
6020  FORMAT(//1H ,'NUMBER OF PULSES = ',I5)
6025  FORMAT(/1H ,A30/1H ,10I5)
6030  FORMAT(/1H ,'TIMEOFPEAK     = ',I5
     $           /1H ,'TIMEOFKNEE     = ',I5
     $           /1H ,'TIMEOFRISE     = ',I5
     $           /1H ,'TIMEOFP1       = ',I5
     $           /1H ,'TIMEOFP2       = ',I5
     $           /1H ,'TIMEOFP3       = ',I5
     $           /1H ,'PERCENTEE      = ',G13.5
     $           /1H ,'PERCENT DROP   = ',G13.5
     $           /1H ,'EXPULSIONENERGY = ',G13.5
     $           /1H ,'INFLECTION     = ',G13.5
     $           /1H ,'NSMODELOUTPUT  = ',G13.5
     $.          /1H ,'IEMODELOUTPUT  = ',G13.5)
      END
```

```
      SUBROUTINE RDOT(WELDLENGTH,R,NUMBEROFPULSES,BEGINOFPULSES,
     $                        ENDOFPULSES,RD)
      INTEGER WELDLENGTH,NUMBEROFPULSES,
     $              BEGINOFPULSES(NUMBEROFPULSES),
     $              ENDOFPULSES(NUMBEROFPULSES),PULSE,LOW,HIGH
      DIMENSION R(WELDLENGTH),RD(WELDLENGTH),TEMP(300)
C
C
C Module RDOT
C ----------
C
C
C     Computes the first derivative of the R-curve.
C
C Note
C ----
C     1) The R-curve (R) is defined from the second point of a given pulse
C        to the last point of that pulse, the first derivative curve (RD)
C        is defined from the third point of a given pulse to the next to
C        last point of that pulse.
C
C     2) This procedure is implemented by a two-pass algorithm; if needed,
C        a one-pass version can be used.
C
C Input
C -----
C     WELDLENGTH, R, NUMBEROFPULSES, BEGINOFPULSES and ENDOFPULSES.
C Output
C ------
C     RD.
C
C Local Variables
C ---------------
C     TEMP - working array (defined from 1 to WELDLENGTH).
C **  PULSE - current pulse number.
C     DT - delta time (constant).
C **  LOW, HIGH - limits.
C
C
C     (* Begin RDOT *)
C
      DT = 1./120.                          !(* compute delta time *)
      DO  I = 1, WELDLENGTH                 !(* zero working array and RD *)
            TEMP(I) = 0
            RD(I) = 0
      END DO
      DO  PULSE = 1, NUMBEROFPULSES         !(* compute dR/dt for
            LOW = BEGINOFPULSES(PULSE) + 1   !all pulses *)
            HIGH = ENDOFPULSES(PULSE) - 1
            DO  I = LOW, HIGH                         !(* compute only for
                  TEMP(I) = (R(I+1)-R(I))/DT           !valid points within
            END DO                                     !a pulse, ignore
      END DO                                           !cool time *)
      DO  PULSE = 1, NUMBEROFPULSES         !(* compute average dR/dt *)
```

```
              LOW = BEGINOFPULSES(PULSE) + 2
              HIGH = ENDOFPULSES(PULSE) - 1
              DO  I = LOW, HIGH
                    RD(I) = (TEMP(I-1)+TEMP(I))/2
              END DO
        END DO
C
C     (* end RDOT *)
C
      RETURN
      END
```

```fortran
      SUBROUTINE CUMENERGY(WELDLENGTH,EE,CEE)
      INTEGER WELDLENGTH
      DIMENSION EE(WELDLENGTH),CEE(WELDLENGTH)
C
C
C Module CUMENERGY
C _____
C
C     Computes the cummulative electrical energy curve.
C
C
C Input
C -----
C     WELDLENGTH and EE.
C Output
C ------
C     CEE.
C
C
C     (* begin CUMENERGY *)
C
      CEE(1) = EE(1)
      DO  I = 2, WELDLENGTH
            CEE(I) = CEE(I-1) + EE(I)
      END DO
C
C     (* end CUMENERGY *)
C
      RETURN
      END
```

```
      SUBROUTINE GETTIMES(WELDLENGTH,R,RD,NUMBEROFPULSES,
     $                          BEGINOFPULSES,ENDOFPULSES,
     $                          RDOTBYPOWERFLAG,TIMEOFPEAK,
     $                          TIMEOFKNEE,TIMEOFRISE,TIMEOFP1,
     $                          TIMEOFP2,TIMEOFP3)
      INTEGER WELDLENGTH,NUMBEROFPULSES,
     $              BEGINOFPULSES(NUMBEROFPULSES),
     $              ENDOFPULSES(NUMBEROFPULSES),TIMEOFPEAK,
     $              TIMEOFKNEE,TIMEOFRISE,TIMEOFP1,TIMEOFP2,
     $              TIMEOFP3,LOCALMINIMUM,PULSE,LOW,MINIMUM,PEAKS(300),
     $              NUMBEROFPEAKS
      REAL KNEETHRESHOLD
      DIMENSION R(WELDLENGTH),RD(WELDLENGTH)
      LOGICAL RCOOL,RDCOOL,RDOTBYPOWERFLAG
C
C
C
C Module GETTIMES
C ───────────────
C
C
C     Finds the time of the R-curve peak, time of the R-curve knee,
C     time of the maximum R-rise rate, time of phenomenon 1,
C     time of phenomenon 2 and time of phenomenon 3.
C
C Note
C ────
C
C     1) By definition, the R-curve peak cannot exist as the last point in
C        a pulse unless it occurs in the last pulse.  If this is not true,
C        i.e., an R-curve peak is the last point in a pulse which is not
C        the last pulse, then the new R-curve peak must be redefined AFTER
C        the old R-curve peak.  This leads to a recursive algorithm that,
C        unfortunately, must stay recursive inorder to satisfy the above
C        criterion.  This means that the multi-pass algorithm cannot be
C        changed to a single pass algorithm by simply ignoring the last
C        point of each pulse.
C
C     2) This module uses modules RCOOL, RDCOOL, FIXTIME and FINDPEAKS.
C
C Input
C ─────
C     WELDLENGTH, R, RD, NUMBEROFPULSES, BEGINOFPULSES,
C     ENDOFPULSES and RDOTBYPOWERFLAG.
C Output
C ──────
C     TIMEOFPEAK, TIMEOFKNEE, TIMEOFRISE, TIMEOFP1, TIMEOFP2
C     and TIMEOFP3.
C
C Local variables
C ───────────────
C     KNEETHRESHOLD - percent threshold used to calculate the actual
C                     knee THRESHOLD (constant).
C **  LOCALMINIMUM - time of first local minimum in the R-curve.
C **  PULSE - current pulse number.
C **  LOW - limit.
```

```
C **   MINIMUM - time of minimum R between first local minimum and peak.
C      THRESHOLD - actual threshold used for locating the knee.
C      P1THRESHOLD - threshold used for locating phenomenon 1.
C      P3THRESHOLD - threshold used for locating phenomenon 3.
C **   PEAKS - sequence of points containing the times of peaks found
C              by module FINDPEAKS (defined from 1 to WELDLENGTH).
C **   NUMBEROFPEAKS - number of peaks found in module FINDPEAKS.
C
C      (* begin GETTIMES *)
C
       KNEETHRESHOLD = 0.25
       IF(RDOTBYPOWERFLAG) THEN
              P1THRESHOLD = -1.0E-6
              P3THRESHOLD = -1.0E-6
       ELSE
              P1THRESHOLD = -1.0E-4
              P3THRESHOLD = -1.0E-4
       END IF
       LOCALMINIMUM = 3
       DO  I = 3, WELDLENGTH                          !(* find first local
              IF(.NOT.RCOOL(I, BEGINOFPULSES, ENDOFPULSES,   !minimum *)
     $             NUMBEROFPULSES)) THEN
                     IF(R(I).GT.R(LOCALMINIMUM)) THEN
                            GO TO 10
                     ELSE
                            LOCALMINIMUM = I
                     END IF
              END IF
       END DO
   10  CONTINUE
       TIMEOFPEAK = LOCALMINIMUM
       DO  I = LOCALMINIMUM, WELDLENGTH               !(* look for
              IF(.NOT.RCOOL(I, BEGINOFPULSES, ENDOFPULSES,   !overall
     $             NUMBEROFPULSES)) THEN                     !R-curve peak
!after local
                     IF(R(I).GT.R(TIMEOFPEAK)) TIMEOFPEAK=I  !minimum *)
              END IF
       END DO
   20  CONTINUE
                                                      !(* redefine R-curve
              DO  PULSE = 1, NUMBEROFPULSES-1    !peak if necessary *)
                     IF(TIMEOFPEAK.EQ.ENDOFPULSES(PULSE)) GOTO 30
              END DO
              GO TO 40
   30         CONTINUE
              TIMEOFPEAK = BEGINOFPULSES(PULSE+1) + 1
              LOW = BEGINOFPULSES(PULSE+1) + 1
              DO  I = LOW, WELDLENGTH
                     IF(.NOT.RCOOL(I, BEGINOFPULSES, ENDOFPULSES,
     $                    NUMBEROFPULSES)) THEN
                            IF(R(I).GT.R(TIMEOFPEAK)) TIMEOFPEAK=I
                     END IF
              END DO
              GO TO 20
```

```
40  CONTINUE
      MINIMUM = LOCALMINIMUM                      !(* find minimum R between first
      DO I = LOCALMINIMUM, TIMEOFPEAK             !local minimum and peak *)
          IF(.NOT.RCOOL(I, BEGINOFPULSES, ENDOFPULSES,
     $             NUMBEROFPULSES)) THEN
              IF(R(I).LT.R(MINIMUM)) MINIMUM = I
          END IF
      END DO
      TIMEOFRISE = MINIMUM                        !(* find maximum R-rise rate
                                                  !between minimum and peak *)
      CALL FIXTIME(TIMEOFRISE, BEGINOFPULSES, ENDOFPULSES,
     $             NUMBEROFPULSES)
      DO I = MINIMUM, TIMEOFPEAK
          IF(.NOT.RDCOOL(I, BEGINOFPULSES, ENDOFPULSES,
     $             NUMBEROFPULSES)) THEN
              IF(RD(I).GT.RD(TIMEOFRISE)) TIMEOFRISE = I
          END IF
      END DO
      THRESHOLD = KNEETHRESHOLD * RD(TIMEOFRISE)   !(* find knee between
                                                   !maximum R-rise rate
                                                   !an peak. last point
                                                   !looking forword or
                                                   !first point looking
                                                   !backword. *)
      DO I = TIMEOFRISE, TIMEOFPEAK
          K = (TIMEOFPEAK - I) + TIMEOFRISE        !(* reverse search *)
          IF(.NOT.RDCOOL(K, BEGINOFPULSES, ENDOFPULSES,
     $             NUMBEROFPULSES)) THEN
              IF(RD(K).GE.THRESHOLD) THEN
                  TIMEOFKNEE = K
                  GO TO 50
              END IF
          END IF
      END DO
50  CONTINUE
      TIMEOFP1 = -1                                !(* find phenomenon 1 after
      DO I = TIMEOFPEAK, WELDLENGTH                !peak *)
          IF(.NOT.RDCOOL(I, BEGINOFPULSES, ENDOFPULSES,
     $             NUMBEROFPULSES)) THEN
              IF(RD(I).LE.P1THRESHOLD) THEN
                  TIMEOFP1 = I
                  GO TO 60
              END IF
          END IF
      END DO
60  CONTINUE
      TIMEOFP3 = -1                                !(* find phenomenon 3 after
      IF(TIMEOFP1.GT.0) THEN                       !phenomenon 1 *)
          LOW = TIMEOFP1
          IF(TIMEOFP1.NE.WELDLENGTH) LOW = TIMEOFP1 + 1
          DO I = LOW, WELDLENGTH
              IF(.NOT.RDCOOL(I, BEGINOFPULSES, ENDOFPULSES,
     $             NUMBEROFPULSES)) THEN
```

```
                            IF(RD(I).GE.P3THRESHOLD) THEN
                                    TIMEOFP3 = I
                                    GO TO 70
                            END IF
                    END IF
                END DO
70          CONTINUE
            IF(TIMEOFP3.LT.0) TIMEOFP3 = WELDLENGTH - 1
    END IF
    TIMEOFP2 = -1                       !(* find phenomenon 2 between
    IF(TIMEOFP1.GT.0) THEN              !phenomenon 1 and
                                        !phenomenon 3 *)
            CALL FINDPEAKS(RD,TIMEOFP1,TIMEOFP3,BEGINOFPULSES,
    $                      ENDOFPULSES, NUMBEROFPULSES, PEAKS,
    $                      NUMBEROFPEAKS)
            IF(NUMBEROFPEAKS.GT.0) THEN  !(* find most negative
                    TIMEOFP2 = PEAKS(1)    !peak if it exists *)
                    DO I = 1, NUMBEROFPEAKS
                            IF(RD(PEAKS(I)).LT.RD(TIMEOFP2))
    $                               TIMEOFP2 = PEAKS(I)
                    END DO
            END IF
    END IF
C
C   (* end GETTIMES *)
C
    RETURN
    END
```

```
      SUBROUTINE PARAM(WELDLENGTH,R,RD,CEE,TIMEOFPEAK,TIMEOFKNEE,
     $                  TIMEOFRISE,TIMEOFP1,TIMEOFP2,TIMEOFP3,
     $                  NUMBEROFPULSES,BEGINOFPULSES,ENDOFPULSES,
     $                  PERCENTEE,PERCENTDROP,EXPULSIONENERGY,
     $                  INFLECTION)
      INTEGER WELDLENGTH,TIMEOFPEAK,TIMEOFKNEE,TIMEOFRISE,
     $        TIMEOFP1,TIMEOFP2,TIMEOFP3,
     $        BEGINOFPULSES(NUMBEROFPULSES),
     $        ENDOFPULSES(NUMBEROFPULSES)
      REAL INFLECTION
      DIMENSION R(WELDLENGTH),RD(WELDLENGTH),CEE(WELDLENGTH)
C
C Module PARAM
C ------------
C
C
C    Computes the model parameters: percent electrical energy after knee,
C    percent R-drop, expulsion energy and inflection.
C
C Note
C ----
C    1) This module calls module R3DOT.
C
C
C
C Input
C -----
C    WELDLENGTH, R, RD, CEE, TIMEOFPEAK, TIMEOFKNEE, TIMEOFRISE,
C    TIMEOFP1, TIMEOFP2, TIMEOFP3, NUMBEROFPULSES,
C    BEGINOFPULSES and ENDOFPULSES.
C Output
C ------
C    PERCENTEE, PERCENTDROP, EXPULSIONENERGY and INFLECTION.
C
C Local variables
C ---------------
C    RD3 - third derivative of R at phenomenon 2.
C
C
C    (* begin PARAM *)
C
      PERCENTEE=(CEE(WELDLENGTH)-CEE(TIMEOFKNEE))/CEE(WELDLENGTH)
      PERCENTDROP = (R(TIMEOFPEAK)-R(WELDLENGTH))/R(TIMEOFPEAK)
      IF(TIMEOFP2.LE.0) THEN         !(* compute inflection only
              INFLECTION = 0                    !if phenomenon 2 exists *)
      ELSE
              CALL R3DOT(RD, BEGINOFPULSES, ENDOFPULSES,
     $                    NUMBEROFPULSES, TIMEOFP2, RD3)
              INFLECTION = 0
              IF(RD(TIMEOFRISE).NE.0)INFLECTION=RD3/RD(TIMEOFRISE)
      END IF
      IF(TIMEOFP1.LE.0) THEN         !(* if phenomenon 1 exists then
              EXPULSIONENERGY = 0              !phenomenon 3 exists *)
      ELSE
              EXPULSIONENERGY = (CEE(TIMEOFP3) - CEE(TIMEOFP1)) /
```

```
      $                              (CEE(TIMEOFP3) - CEE(TIMEOFKNEE))
      END IF
C
C     (* end PARAM *)
C
      RETURN
      END
```

```
      SUBROUTINE NSMODEL(PERCENTEE,PERCENTDROP,NSMODELOUTPUT)
      REAL NSMODELOUTPUT
C
C Module NSMODEL
C ─────────────
C
C
C     Computes nugget/sticker model output given the two input parameters.
C
C
C
C Input
C ─────
C     PERCENTEE and PERCENTDROP.
C Output
C ──────
C     NSMODELOUTPUT >= zero implies NUGGET,
C                   <  zero implies STICKER.
C
C
C Local variables
C ───────────────
C     A0 - constant coefficient.
C     A1 - PERCENTEE coefficient.
C     A2 - PERCENTDROP coefficient.
C
C
C     (* begin NSMODEL *)
C
      A0 = -0.53                              !(* subject to change *)
      A1 = +1.00                              !(* subject to change *)
      A2 = +7.5                               !(* subject to change *)
      NSMODELOUTPUT = A0 + A1 * PERCENTEE + A2 * PERCENTDROP
C
C     (* end NSMODEL *)
C
      RETURN
      END
```

```
      SUBROUTINE IEMODEL(TIMEOFP2,EXPULSIONENERGY,INFLECTION,
     $                           IEMODELOUTPUT)
      INTEGER TIMEOFP2
      REAL INFLECTION,IEMODELOUTPUT
C
C
C Module IEMODEL
C ----------
C
C     Computes interior/edge model output given the three input parameters.
C
C
C
C Input
C -----
C     TIMEOFP2, EXPULSIONENERGY and INFLECTION.
C Output
C -----
C     IEMODELOUTPUT >= zero implies INTERIOR,
C                   <  zero implies EDGE.
C
C Local variables
C ----------
C     B0 - constant coefficient.
C     B1 - EXPUSLIONENERGY coefficient.
C     B2 - INFLECTION coefficient.
C
C
C     (* begin IEMODEL *)
C
      B0 = +1.00                           !(* subject to change *)
      B1 = -1.00/0.36                      !(* subject to change *)
      B2 = +1.00/1.50                      !(* subject to change *)
      IF(TIMEOFP2.LE.0) THEN
              IEMODELOUTPUT = 1.00
      ELSE
              IEMODELOUTPUT = B0+B1*EXPULSIONENERGY+B2*INFLECTION
      END IF
C
C     (* end IEMODEL *)
C
      RETURN
      END
```

```
      LOGICAL FUNCTION RCOOL(INDEX,BEGINOFPULSES,ENDOFPULSES,
     $                      NUMBEROFPULSES)
      INTEGER BEGINOFPULSES(NUMBEROFPULSES),
     $                ENDOFPULSES(NUMBEROFPULSES)
C
C
C Module RCOOL
C ───────
C
C
C     Determines whether or not an R-curve index is in the cool time.
C
C
C CALLING SEQUENCE:  LOGICALVARIABLE = RCOOL(INDEX, BEGINOFPULSES,
C                                            ENDOFPULSES, NUMBEROFPULSES)
C
C Input
C ─────
C     INDEX, BEGINOFPULSES, ENDOFPULSES and NUMBEROFPULSES.
C Output
C ──────
C     RCOOL = .TRUE.  if INDEX is in cool time,
C             .FALSE. otherwise.
C
C
C     (* begin RCOOL *)
C
      RCOOL = .FALSE.
      DO  I = 1, NUMBEROFPULSES-1
            IF(INDEX.GT.ENDOFPULSES(I).AND.
     $              INDEX.LT.BEGINOFPULSES(I+1)+1) RCOOL = .TRUE.
      END DO
C
C     (* end RCOOL*)
C
      RETURN
      END
```

```fortran
      LOGICAL FUNCTION RDCOOL(INDEX,BEGINOFPULSES,ENDOFPULSES,
     $                        NUMBEROFPULSES)
      INTEGER BEGINOFPULSES(NUMBEROFPULSES),
     $                ENDOFPULSES(NUMBEROFPULSES)
C
C
C Module RDCOOL
C ------------
C
C     Determines whether or not a first derivative of R-curve index
C     is in the cool time.
C
C
C Calling sequence:  LOGICALVARIABLE = RDCOOL(INDEX, BEGINOFPULSES,
C                                             ENDOFPULSES, NUMBEROFPULSES)
C
C Input
C -----
C     INDEX, BEGINOFPULSES, ENDOFPULSES and NUMBEROFPULSES.
C Output
C ------
C     RDCOOL = .TRUE.  if INDEX is in cool time,
C              .FALSE. otherwise.
C
C
C     (* begin RDCOOL *)
C
      RDCOOL = .FALSE.
      DO I = 1, NUMBEROFPULSES-1
            IF(INDEX.GT.ENDOFPULSES(I)-1.AND.
     $                INDEX.LT.BEGINOFPULSES(I+1)+2) RDCOOL = .TRUE.
      END DO
      IF(INDEX.EQ.ENDOFPULSES(NUMBEROFPULSES)) RDCOOL = .TRUE.
C
C     (* end RDCOOL*)
C
      RETURN
      END
```

```
      SUBROUTINE FIXTIME(INDEX,BEGINOFPULSES,ENDOFPULSES,
     $                   NUMBEROFPULSES)
      INTEGER BEGINOFPULSES(NUMBEROFPULSES),
     $        ENDOFPULSES(NUMBEROFPULSES)
C
C
C Module FIXTIME
C ──────────────
C
C
C     Converts a possibly invalid time on the first derivative of R-curve
C     to a valid one.
C
C
C
C Calling sequence:  CALL FIXTIME(INDEX, BEGINOFPULSES, ENDOFPULSES,
C                                 NUMBEROFPULSES)
C
C
C Input
C ─────
C     INDEX, BEGINOFPULSES, ENDOFPULSES and NUMBEROFPULSES.
C Output
C ──────
C     INDEX - corrected if necessary.
C
C
C
C    (* begin FIXTIME *)
C
      DO I = 1, NUMBEROFPULSES
            IF(INDEX.EQ.BEGINOFPULSES(I)+1)
     $            INDEX = BEGINOFPULSES(I) + 2
            IF(INDEX.EQ.ENDOFPULSES(I))
     $            INDEX = ENDOFPULSES(I) - 1
      END DO
C
C    (* end FIXTIME *)
C
      RETURN
      END
```

```
      SUBROUTINE FINDPEAKS(RD,TIMEOFP1,TIMEOFP3,BEGINOFPULSES,
     $                     ENDOFPULSES,NUMBEROFPULSES,PEAKS,
     $                     NUMBEROFPEAKS)
      INTEGER TIMEOFP1,TIMEOFP3,BEGINOFPULSES(NUMBEROFPULSES),
     $        ENDOFPULSES(NUMBEROFPULSES),PEAKS(1)
      DIMENSION RD(1)
C
C
C Module FINDPEAKS
C ----------------
C
C     Finds negative R-DOT peaks between phenomenon 1 and phenomenon 3.
C
C
C Calling sequence:   CALL FINDPEAKS(RD, TIMEOFP1, TIMEOFP3, BEGINOFPULSES,
C                                    ENDOFPULSES, NUMBEROFPULSES, PEAKS,
C                                    NUMBEROFPEAKS)
C
C Input
C -----
C     RD, TIMEOFP1, TIMEOFP3, BEGINOFPULSES, ENDOFPULSES
C     and NUMBEROFPULSES.
C Output
C ------
C     PEAKS - sequence of points containing the times of negative peaks found.
C     NUMBEROFPEAKS - number of negative peaks found.
C
C
C    (* begin FINDPEAKS *)
C
      NUMBEROFPEAKS = 0
      IF(TIMEOFP1.GT.0) THEN
            DO 10  I = TIMEOFP1, TIMEOFP3
                                                !(* search between
                                                !beginning of pulse+3
                                                !and end of pulse-2
     *)
                IF(I.LT.BEGINOFPULSES(1)+3) GO TO 10
                DO  J = 1, NUMBEROFPULSES-1
                    IF(I.GT.ENDOFPULSES(J)-2.AND.
     $                   I.LT.BEGINOFPULSES(J+1)+3) GO TO 10
                END DO
                IF(I.GT.ENDOFPULSES(NUMBEROFPULSES)-2)GOTO10
                IF(RD(I).LT.0) THEN
                    IF(RD(I).LT.RD(I-1).AND.RD(I).LT.RD(I+1))
     $                  THEN
                        NUMBEROFPEAKS=NUMBEROFPEAKS+1
                        PEAKS(NUMBEROFPEAKS) = I
                    END IF
                END IF
10          END DO
      END IF
C
```

```
C       (* end FINDPEAKS *)
C
        RETURN
        END
```

```
      SUBROUTINE R3DOT(RD,BEGINOFPULSES,ENDOFPULSES,
     $                         NUMBEROFPULSES,TIMEOFP2,RD3)
      INTEGER BEGINOFPULSES(NUMBEROFPULSES),
     $           ENDOFPULSES(NUMBEROFPULSES),TIMEOFP2,
     $           PULSE,LOW,HIGH
      DIMENSION RD(1),TEMP(3),WEIGHT(3)
C
C
C Module R3DOT
C ------------
C
C
C     Computes the third derivative of R, at a single point, given
C     the first derivative of R.
C
C
C Calling sequence:  CALL R3DOT(RD, BEGINOFPULSES, ENDOFPULSES,
C                         NUMBEROFPULSES, TIMEOFP2, RD3)
C
C
C Input
C -----
C
C     RD, BEGINOFPULSES, ENDOFPULSES and TIMEOFP2.
C Output
C ------
C     RD3.
C
C Local variables
C ---------------
C ** PULSE - current pulse.
C ** LOW, HIGH - limits.
C    TEMP - work array (defined form 1 to 3).
C    WEIGHT - weighting array (defined 1 to 3).
C
C
C    (* begin R3DOT *)
C
      WEIGHT(1) = +1
      WEIGHT(2) = -2
      WEIGHT(3) = +1
      RD3 = 0
      IF(TIMEOFP2.GT.0) THEN
           PULSE = 0                     !(* compute limits *)
           DO I = 1, NUMBEROFPULSES
                IF(TIMEOFP2.GE.BEGINOFPULSES(I).AND.
     $               TIMEOFP2.LE.ENDOFPULSES(I)) PULSE = I
           END DO
           LOW = BEGINOFPULSES(PULSE) + 2
           HIGH = ENDOFPULSES(PULSE) - 1
           DO I = 1, 3
                INDEX = (TIMEOFP2-1) + (I-1)    !(* get R-DOT points of
                IF(INDEX.LT.LOW) INDEX = LOW    ! interest *)
                IF(INDEX.GT.HIGH) INDEX = HIGH
                TEMP(I) = RD(INDEX)
```

```
            END DO
            DO  I = 1, 3                            !(* compute the third
                 RD3 = RD3 + WEIGHT(I) * TEMP(I)    !derivative *)
            END DO
         END IF
C
C     (* end R3DOT *)
C
      RETURN
      END
```

```
      SUBROUTINE GETPULSES(R,WELDLENGTH,NUMBEROFPULSES,
     $                              BEGINOFPULSES,ENDOFPULSES)
      INTEGER WELDLENGTH,BEGINOFPULSES(1),ENDOFPULSES(1)
      DIMENSION R(WELDLENGTH)
      LOGICAL HEAT
C
C
C Module GETPULSES
C ----------------
C
C     Finds the beginning and ending half-cycles of each pulse
C
C
C
C Input
C -----
C     R and WELDLENGTH.
C Output
C ------
C     NUMBEROFPULSES, BEGINOFPULSES and ENDOFPULSES.
C
C Local variables
C ---------------
C     HEAT = .TRUE.  if the previous half-cycle was in the heat time,
C            .FALSE. if the previous half-cycle was not in the haet time.
C
C
C     (* begin GETPULSES *)
C
      NUMBEROFPULSES = 0
      HEAT = .FALSE.
C
      DO  I = 1,WELDLENGTH
              IF(R(I).NE.0.0) THEN
                      IF(.NOT.HEAT) THEN               !(* in heat time *)
                              NUMBEROFPULSES = NUMBEROFPULSES + 1
                              BEGINOFPULSES(NUMBEROFPULSES) = I
                              ENDOFPULSES(NUMBEROFPULSES)   = -1
                              HEAT = .TRUE.
                      END IF
              ELSE IF(HEAT) THEN                  !(* not in heat time *)
                      ENDOFPULSES(NUMBEROFPULSES) = I-1
                      HEAT = .FALSE.
              END IF
      END DO
      IF(ENDOFPULSES(NUMBEROFPULSES).LE.0)
     $          ENDOFPULSES(NUMBEROFPULSES) = WELDLENGTH
C
C     (* end GETPULSES *)
C
      RETURN
      END
```

```
      SUBROUTINE RDOTBYPOWER(WELDLENGTH,RD,EE,NUMBEROFPULSES,
     $                              BEGINOFPULSES,ENDOFPULSES)
      INTEGER WELDLENGTH,NUMBEROFPULSES,
     $              BEGINOFPULSES(NUMBEROFPULSES),
     $              ENDOFPULSES(NUMBEROFPULSES),PULSE
      DIMENSION RD(WELDLENGTH),EE(WELDLENGTH)
C
C
C
C Module RDOTBYPOWER
C ------------------
C
C
C     Computes the first derivative of resistance divided by power curve.
C
C
C Note
C ----
C     RD is redefined to be the R-DOT/POWER curve.
C
C
C Input
C -----
C     WELDLENGTH, RD, EE, NUMBEROFPULSES, BEGINOFPULSES and
C     ENDOFPULSES.
C
C Output
C ------
C     RD.
C
C Local variables
C ---------------
C **  PULSE - current pulse.
C **  LOW, HIGH - limits.
C
C
C     (* begin RDOTBYPOWER *)
C
      DO PULSE = 1, NUMBEROFPULSES
            LOW  = BEGINOFPULSES(PULSE)
            HIGH = ENDOFPULSES(PULSE)
            DO  I = LOW, HIGH
                   IF(EE(I).NE.0.0) THEN
                         RD(I) = RD(I)/EE(I)
                   ELSE
                         RD(I) = 0.0
                   END IF
            END DO
      END DO
C
C     (* end RDOTBYPOWER *)
C
      RETURN
      END
```